(12) United States Patent
Kase

(10) Patent No.: US 9,054,778 B2
(45) Date of Patent: Jun. 9, 2015

(54) TRANSMISSION LINE PROTECTIVE RELAY DEVICE

(71) Applicant: Kabushiki Kaisha Toshiba, Tokyo (JP)

(72) Inventor: Takahiro Kase, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/360,818

(22) PCT Filed: Nov. 22, 2012

(86) PCT No.: PCT/JP2012/007530
§ 371 (c)(1),
(2) Date: May 27, 2014

(87) PCT Pub. No.: WO2013/076992
PCT Pub. Date: May 30, 2013

(65) Prior Publication Data
US 2014/0307758 A1   Oct. 16, 2014

(30) Foreign Application Priority Data

Nov. 25, 2011   (JP) ................................ 2011-257703

(51) Int. Cl.
*H04B 3/36* (2006.01)
*H02H 7/26* (2006.01)
*H02H 3/30* (2006.01)

(52) U.S. Cl.
CPC ................. *H04B 3/36* (2013.01); *H02H 7/263* (2013.01); *H02H 3/305* (2013.01)

(58) Field of Classification Search
CPC ........... H02H 7/263; H02H 3/305; H04B 3/36
See application file for complete search history.

(56) References Cited

U.S. PATENT DOCUMENTS

| | | | |
|---|---|---|---|
| 2004/0071080 A1* | 4/2004 | Uchiyama et al. | 370/225 |
| 2007/0067132 A1* | 3/2007 | Tziouvaras et al. | 702/122 |
| 2010/0241902 A1* | 9/2010 | Gilbertson et al. | 714/33 |

FOREIGN PATENT DOCUMENTS

| | | |
|---|---|---|
| JP | 57 116532 | 7/1982 |
| JP | 63 245213 | 10/1988 |
| JP | 4 197022 | 7/1992 |
| JP | 5 76134 | 3/1993 |
| JP | 10 70834 | 3/1998 |
| JP | 2003 111266 | 4/2003 |

OTHER PUBLICATIONS

International Search Report Issued Mar. 12, 2013 in PCT/JP12/007530 Filed Nov. 22, 2012.

* cited by examiner

*Primary Examiner* — Jaison Joseph
(74) *Attorney, Agent, or Firm* — Oblon, McClelland, Maier & Neustadt, L.L.P.

(57) ABSTRACT

In a protective relay device for a three-terminal transmission line comprising terminal A, terminal B and terminal C, when for example terminal information is transmitted to a protective relay Ry-A of one remote terminal (terminal A) from the protective relay Ry-C of the terminal C, terminal information Db that was sent from the protective relay Ry-B of another remote terminal (terminal B) is transmitted, in addition to the information Dc of the terminal in question. In the same way, when terminal information is transmitted to a protective relay Ry-B of the terminal B from the protective relay Ry-C of the terminal C, terminal information Da that was sent from the protective relay Ry-A of the terminal A is transmitted, in addition to the information Dc of the terminal in question.

8 Claims, 13 Drawing Sheets

|  |  | TRANSMISSION SOURCE | | | |
|---|---|---|---|---|---|
|  |  | Ry-A | Ry-B | Ry-C | Ry-D |
| TRANSMISSION DESTINATION | Ry-A |  | Ry-B + Ry-D | Ry-C + Ry-B | Ry-D + Ry-C |
|  | Ry-B | Ry-A + Ry-D |  | Ry-C + Ry-A | Ry-D + Ry-C |
|  | Ry-C | Ry-A + Ry-D | Ry-B + Ry-A |  | Ry-D + Ry-B |
|  | Ry-D | Ry-A + Ry-B | Ry-B + Ry-C | Ry-C + Ry-A |  |

TRANSMISSION LINE PROTECTIVE RELAY DEVICE

CROSS-REFERENCE TO RELATED APPLICATION

This is a Continuation of PCT Application No. PCT/JP2012/007530, filed on Nov. 22, 2012, which is based upon and claims the benefit of priority from the prior Japanese Patent Application No. 2011-257703, filed on Nov. 25, 2011, the entire contents of which are incorporated herein by reference.

FIELD

The present embodiment of the invention relates to a transmission line protective relay device whereby the reliability of terminal information can be improved.

BACKGROUND

As transmission line protective relay devices, there are available for example current differential relay devices or directional comparative distance relay devices. Of these, a current differential relay device distinguishes and detects with high accuracy internal faults or external faults in zones that are to be protected, by employing the current of the transmission line terminals. Typically, distinguishing between internal faults and external faults is performed by finding the vector sum of the terminal currents as the operating amount (Id) and finding the scalar sum of the terminal currents as the suppression amount (Ir); ratio/difference characteristics are constructed using this operating amount (Id) and suppression amount (Ir) and operation or non-operation are distinguished in terms of these characteristics.

FIG. 18 shows an example of the layout of a current differential relay device and the typical ratio difference characteristic. FIG. 18 shows a current differential relay device Ry-A that is arranged at one terminal (terminal A) of a transmission line TL of two-terminal construction. $CT_A$ and $CT_B$ are respectively instrument current transformers arranged at the terminal A and terminal B; 2 is input processing means; 3 is reception processing means; and 11 is computation means. The computation means 11 comprises: a vector sum computation section $11_{-1}$ that calculates the vector sum (Id) of the transmission line currents IA, IB; a scalar sum computation section $11_{-2}$ that calculates the scalar sum (Ir) thereof; and an operation evaluation section (OES) $11_{-3}$ of the ratio difference characteristic (RDC). Even in the case of a system with three or more terminals, the operating amount Id is also found by the vector sum of the totality of terminal currents and the suppression amount Ir is also found by the scalar sum of the totality of terminal currents.

The operation evaluation section $11_{-3}$ using the ratio difference characteristic shown in FIG. 18 employs two characteristics, namely: a small current zone characteristic (Df1) that is arranged to be capable of detection even when the fault current is small, as in the case of an internal fault; and a large current zone characteristic (Df2) for preventing spurious operation from being produced by the difference in error currents amplified by the instrument current transformer CT when large current passes, as in the case of an external fault: when Df1 and Df2 are both operating, the current differential relay device that is thereby constituted generates an operating output.

FIG. 19 shows the case where a current differential relay device is applied to a transmission line of three-terminal construction. When this transmission line relay protective device is applied to a three-terminal transmission line, as shown in FIG. 19, occurrence of a fault in the zone that is subject to protection is diagnosed by finding the operating amount and suppression amount in the same way as in the case of a two-terminal transmission line as described above, but using the current information of this three-terminal transmission line: the current information of a terminal in question is delivered to the two remote terminals through the transmission line or the respective local current information is acquired through the transmission line simultaneously from the two remote terminals. Lab, Lbc, Lca, indicated by the broken lines, are communication channels arranged between the current differential relay devices of each terminal: specifically, the communication channel Lab connects the current differential relay device Ry-A of the terminal A and the current differential relay device Ry-B of the terminal B; the communication channel Lbc connects the current differential relay device Ry-B of the terminal B and the current differential relay device Ry-C of the terminal C; and the communication channel Lca connects the current differential relay device Ry-C of the terminal C and the current differential relay device Ry-A of the terminal A. Although these communication channels are indicated in the drawings by wires, they could of course be constituted by exchange of electromagnetic waves.

FIG. 20 shows the case where a current differential relay device is applied to a transmission line of five-terminal construction.

Although, in the case of transmission lines of a construction with four terminals or more, the communication channel layout has a star configuration, the principle is the same as in the case of a transmission line of two-terminal construction, except for the fact that the number of data-sending parties and the number of data-receiving parties are different.

Next, the case of a directional comparative distance relay device will be described. In the case of the directional comparative distance relay device, the fault direction and the distance to the fault point with reference to the installation position of the relay device are found from the voltage and current relationship detected at each terminal of the transmission line. There are a number of ways of doing this: FIG. 21 shows the characteristic of a directional distance relay, called a Mho type relay. In the case of a Mho type relay, it operates when there is the impedance found from the voltage and current in the circular region of the Mho characteristic.

FIG. 22 shows the case where a directional comparative distance relay device is applied to a transmission line of three-terminal construction. In this case, as a typical example, the direction evaluation operating zone of a directional comparative distance relay device Ry-A installed at the A terminal is indicated by a broken line. The reason why the direction evaluation operating zone is extended as far as and including the region to the rear of terminal B and terminal C is in order to find fault points in the region from the terminal A to beyond the remote terminals (terminal B, terminal C): this is called overreaching. When the directional comparative distance relay device of any terminal is operated, the information is transmitted to the remote terminals. At each terminal, if the information at the terminal in question and the incoming information from two remote terminals (in the three-terminal case) all indicate a forward fault, the fault point is evaluated as being internal, and the breakers at each terminal are tripped.

In the case of FIG. 22, if the directional comparative distance relay device Ry-A installed at terminal A indicates a forward fault, and signals indicating detection of a forward fault are received from the directional comparative distance relay device Ry-B of the terminal B and the directional comparative distance relay device Ry-C of the terminal C, terminal B and terminal C being remote terminals, finally, a trip signal is sent to the breaker of the terminal in question (the terminal A). Exactly the same applies in the case of the directional comparative distance relay device Ry-b installed at the terminal B and the directional comparative distance relay device Ry-C installed at the terminal C.

Other examples of a directional comparative distance relay device include a system in which a block signal (breaker trip blocking signal) is sent to a remote terminal if a rearward fault is found, or a breaker trip-enabling signal is sent to a remote terminal when an internal fault is detected, or combinations of such systems. Although the logic of the fault evaluation section differs, depending on the system, they have in common a device or communication channel whereby signals are exchanged with remote terminals.

And, in order to improve reliability of the transmission line protective relay device, various inventions have been disclosed in which the transmission means that transmits the terminal information is duplicated.

Examples of such devices are disclosed in laid-open Japanese Patent Application No. Tokkai H 11-69606 (hereinafter referred to as Patent Reference 1), Tokkai H 10-23654 (hereinafter referred to as Patent Reference 2) and Tokkai 2007-236097 (hereinafter referred to as Patent Reference 3).

With the invention set out in Patent Reference 1, if some problem occurs on a communication channel in a transmission line protective device with three or more terminals, an attempt is made to deliver the signal by reconstituting the communication channel; however, there was the problem that, since the method of communication was altered after detection of occurrence of a communication malfunction, arrival of the information with the remote party was delayed. Also, processing tends to become complicated due to the need to achieve urgent processing.

Also, the invention set out in Patent Reference 2 consists in a multi-terminal transmission line protective relay device in which two or more terminals comprise a parent device and the remaining terminals comprise a child device; in this system, when the protective relay of the parent device detects occurrence of a fault, a trip command is delivered to the protective relay of the child devices. In the case of this system, while there is the advantage that the computation can be performed once information has been collected by some of the protective relays, there is the problem that, owing to the need to deliver the computation result of the protective relay to the other devices, operation is delayed to that extent. Also, since a trip command is delivered, if for example a trip command is output by mistake due to the occurrence of some problem in the protective relay that performs the calculation, there is a risk that all the other protective relays will be tripped.

Furthermore, although, in the case of the invention set out in Patent Reference 3, reliability is increased by the fact that all transmissions are duplicated, this has the problem of increasing costs.

Accordingly, an object of the present invention is to provide a transmission line protective relay device installed on a transmission line of three or more terminals wherein equipment costs can be suppressed and even if a partial communication failure occurs, recovery can be achieved in a comparatively short time, by having each terminal transmit the incoming terminal information transmitted from other remote terminals in combined fashion when information of the terminal in question is transmitted to a predetermined remote terminal.

In order to achieve the above object, a transmission line protective relay device according to Embodiment 1 is constructed as follows. Specifically, a transmission line protective relay device wherein evaluation of whether or not a fault has occurred on a protected transmission line that has terminals with transformers installed on multiple transmission lines with three terminals or more is performed by mutual exchange of terminal information based on the currents input from the transformers of each terminal through respective communication channels, and current difference computation is performed using the terminal information of the terminal in question and the incoming terminal information received from remote terminals respectively comprises:

an input processing means that is arranged to connect the transmission line protective relay device arranged at each terminal with each communication channel, and to output the incoming current at the terminal in question as terminal information by input processing, at each transmission line protective relay device of each terminal;

a plurality of reception processing means that respectively receives terminal information delivered from a remote terminal connected with the terminal in question by a communication channel;

a computational processing means that performs current difference computation by inputting the terminal information that was output from said input means and the terminal information of the remote terminal that was output from said plurality of reception means; and a transmission processing means that transmits main terminal information constituting the terminal information of the terminal in question and backup terminal information constituting terminal information of a remote terminal that is different from the remote terminal in question, to a remote terminal connected by a communication channel with the terminal in question;

and is characterized in that said computational processing means, if main terminal information and backup terminal information cannot be received in a predetermined time from an arbitrary communication channel of the communication channels, performs current difference computation using the terminal information of all of the terminals, using the backup terminal information delivered through another communication channel, instead of the main terminal information that could not be received from the communication channel in question.

Also, a transmission line protective relay device according to Embodiment 2 is constructed as follows. Specifically, a transmission line protective relay device wherein evaluation of whether or not a fault has occurred on a protected transmission line that has terminals with transformers installed on a transmission line with three terminals or more is performed by mutual exchange of terminal information relating to the calculated direction of the fault point and impedance as far as and including the fault point based on the voltages and currents input from the transformers of each terminal through respective communication channels, from the information of the terminal in question and the terminal information delivered from a plurality of remote terminals respectively comprises:

an input processing means that is arranged to connect the transmission line protective relay device arranged at each terminal with each communication channel, and to output the voltage and current that are input from the transformer at the terminal in question as terminal information by input processing, at each transmission line protective relay device of each terminal;

a plurality of reception processing means that respectively receives terminal information delivered from a remote terminal connected with the terminal in question by a communication channel;

a computational processing means that determines whether a forward fault is present or not by calculating the direction of the fault point and the impedance as far as and including the fault point, based on the voltage and current of the terminal in question that are output from said input processing means;

a final decision section that inputs the computation result data obtained by said computational processing means and the terminal information that is output from said plurality of reception processing means and that makes a final decision to identify a transmission line as faulty, if all of this terminal information identifies this as a forward fault; and a transmission processing means that transmits main terminal information constituting the calculation results data of the terminal in question and backup terminal information constituting terminal information of a remote terminal that is different from the remote terminal in question, to a remote terminal connected by a communication channel with the terminal in question;

and is characterized in that said final decision section, if main terminal information and backup terminal information cannot be received in a predetermined time from an arbitrary communication channel of the communication channels, makes a final decision using the backup terminal information delivered through another communication channel, instead of the main terminal information that could not be received from the communication channel in question.

Further, a transmission line protective relay device according to embodiment 5 wherein evaluation of whether or not a fault has occurred on a protected transmission line wherein respective transmission line protective relay devices are installed at both terminals of a two-terminal transmission line that has two circuits installed, terminal information being exchanged through communication channels mutually between the transmission line protective relay devices that are respectively provided on opposite terminals, using the terminal information of the terminal in question and the terminal information received by a remote terminal is characterized in that it comprises:

an input processing means that delivers output as information of the terminal in question by input processing of the current that is input from the transformer of the terminal in question;

a first reception processing means that receives the terminal information transmitted from a remote terminal of the transmission line that is being protected;

a second reception processing means that receives terminal information transmitted from one terminal of a transmission line that is not being protected;

a third reception processing means that receives data obtained by said remote terminal of said transmission line that is being protected, in addition to the terminal information obtained by the other terminal of said transmission line that is not being protected;

a first transmission processing means that transmits to a remote terminal of said transmission line that is being protected the terminal information of the terminal in question that was output from said input means;

a second transmission processing means that transmits in combination to a transmission line protective relay device provided at another terminal of said transmission line that is not being protected, the terminal information that is output from said second reception processing means and the terminal information of the terminal in question that is output from said input means;

a third transmission processing means that transmits terminal information obtained by the other terminal of the transmission line that is not being protected, of the terminal information output from said third reception processing means, to a transmission line protection relay device of said one terminal of this transmission line that is not being protected; and a computational processing means that performs protective computation by inputting terminal information obtained by the other terminal of the transmission line, which is being protected, of the terminal information of the terminal in question that was output from said input means and the terminal information that was output from said first reception processing means and the terminal information that was output from said third reception processing means.

In addition, a transmission line protective relay device according to Embodiment 6 has the following construction. Specifically, a transmission line protective relay device wherein evaluation of whether or not a fault has occurred on a protected transmission line wherein respective transmission line protective relay devices are installed at both terminals of a two-terminal transmission line that has two circuits installed, terminal information relating to the calculated direction of the fault point and impedance as far as and including the fault point based on the voltages and currents input from the transformers of each terminal being exchanged through communication channels mutually between said transmission line protective relay devices, by using the terminal information of the terminal in question and terminal information of a remote terminal that has thus been received, comprises:

an input processing means that delivers output as information of the terminal in question by input processing of the voltage and current of the terminal in question that is input from the transformer of the terminal in question;

a first reception processing means that receives the terminal information transmitted from a remote terminal of the transmission line that is being protected; a second reception processing means that receives terminal information transmitted from one terminal of a transmission line that is not being protected;

a third reception processing means that receives terminal information obtained by said remote terminal of said transmission line that is being protected, in addition to the terminal information obtained by the other terminal of said transmission line that is not being protected;

a computational processing means that determines whether a forward fault is present or not by calculating the direction of the fault point and the impedance as far as and including the fault point, based on the voltage and current of the terminal in question that are output from said input processing means;

a first transmission processing means that transmits to a remote terminal of said transmission line that is being protected the terminal information of the terminal in question that was output from said computational processing means;

a second transmission processing means that transmits in combination to a transmission line protective relay device provided at another terminal of said transmission line that is not being protected, the terminal information that is output from said second reception processing means and the terminal information of the terminal in question that is output from said computational processing means;

a third transmission processing means that transmits terminal information obtained by the other terminal of the transmission line that is not being protected, of the terminal information output from said third reception processing means, to a transmission line protection relay device of said one terminal of this transmission line that is not being protected; and a computational processing means that performs protective computation by inputting terminal information obtained by the other terminal of the transmission line, which is being protected, of the terminal information of the terminal in question that was output from said input means and the terminal information that was output from said first reception processing means and the terminal information that was output from said third reception processing means.

DETAILED DESCRIPTION OF THE PREFERRED EMBODIMENTS

Figure 1:
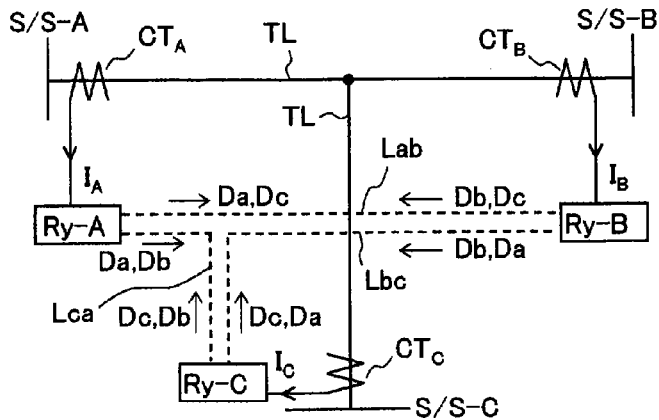
FIG. 1 is a view showing the layout of transmission lines and communication channels of a three-terminal layout according to Embodiment 1 of the present invention.

Embodiments of the present invention are described below with reference to the drawings. It should be noted that repetition of description is avoided by giving components or functions the same reference symbols in the drawings, including the drawings of the prior art.

Embodiment 1

A transmission line protective relay device according to Embodiment 1 is described below with reference to FIG. 1 to FIG. 4. In this Embodiment 1, the transmission line protective relay device is constituted by a current differential relay device.

FIG. 1 shows an arrangement in which respective current differential relay devices are installed at the 3 terminals of a transmission line, and exchange of terminal information (in this case, current data) is performed through communication channels mutually between the respective current differential relay devices of each terminal.

In FIG. 1, S/S-A, S/S-B and S/S-C are substations of a three-terminal type transmission line TL, and will be respectively referred to as terminal A, terminal B and terminal C. Respective current differential relay devices Ry-A, Ry-B and Ry-C are installed at terminal A, terminal B and terminal C. Hereinafter, in Embodiment 1, the current differential relay devices will be referred to as "protective relays".

$CT_A$, $CT_B$ and $CT_C$ are instrument transformers or current transformer that are respectively installed at terminal A, terminal B and terminal C; these transform the transmission line current at each terminal and output currents $I_A$, $I_B$ and $I_C$, which are respectively input to the protective relays Ry-A, Ry-B and Ry-C of each terminal. The protective relays Ry-A, Ry-B and Ry-C are arranged so that current data $D_a$, $D_b$ and $D_c$ in the form of digital quantities is obtained by input processing of the currents $I_A$, $I_B$ and $I_C$. The current data $D_a$, $D_b$ and $D_c$ is sometimes referred to as "terminal information".

Also, communication channels Lab, Lbc and Lca indicated by broken lines are arranged between the protective relays Ry-A, Ry-B and Ry-C, so that terminal information constituted by the current data $D_a$, $D_b$ and $D_c$ processed by the protective relays Ry-A, Ry-B and Ry-C can be mutually exchanged through these communication channels Lab, Lbc and Lca. The symbols $D_a$, Db and $D_c$ together with the arrows (→) on the communication channels Lab, Lbc and Lca indicate diagrammatically the direction of transmission of the terminal information (current data).

Figure 2:
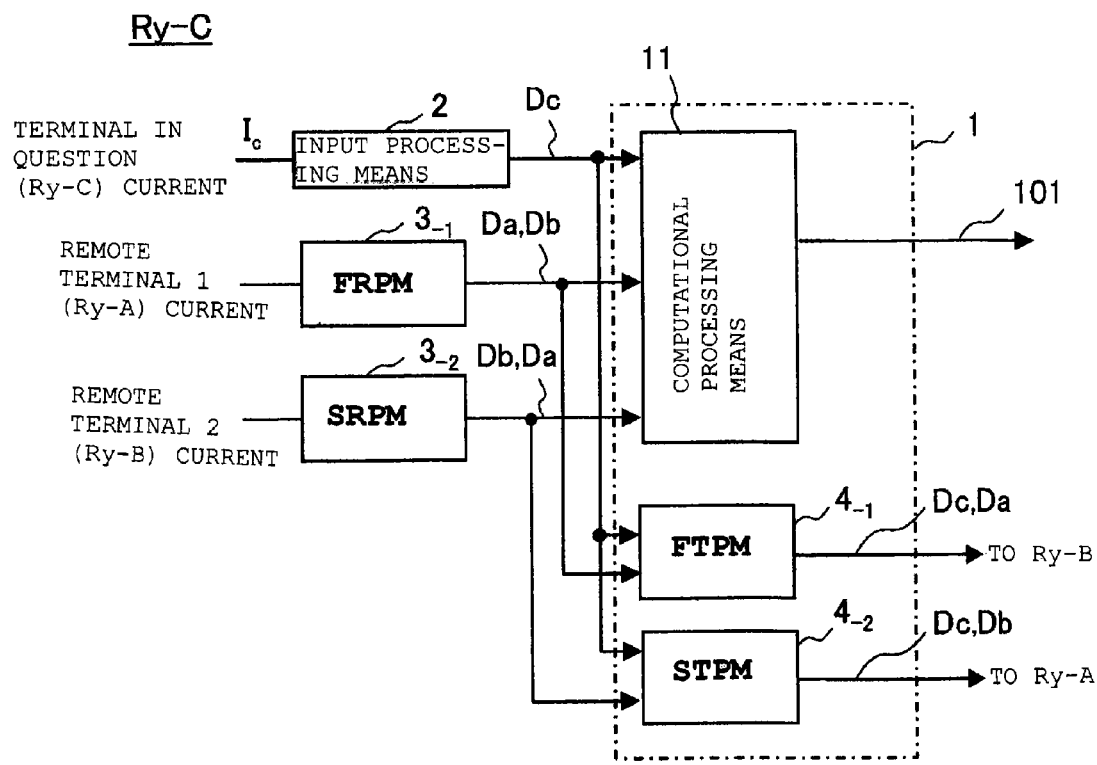
FIG. 2 is a logic diagram showing an example of the internal processing in Embodiment 1 when a current difference protective relay device is employed as a transmission line protective relay device.

FIG. 2 is a functional block diagram showing an example of the internal processing of the protective relay Ry-C that is installed at the terminal C, which is one of the three terminals.

Since the transmission line is a three-terminal transmission line, as far as the C terminal is concerned there are two remote terminals. Of these, the protective relay Ry-A that is installed at the terminal A, which constitutes the first remote terminal (designated as remote terminal 1) and the protective relay Ry-B that is installed at the terminal B, which constitutes the second remote terminal have exactly the same construction as shown in FIG. 2.

In this description, the "internal processing at the protective relay" refers collectively to for example the input processing for inputting the electrical quantities of the terminal in question to the computation circuit (computation section); the reception processing of incoming information transmitted from the remote terminals 1 and 2; the transmission processing of transmitting the information of the terminal in question to the remote terminals 1 and 2; and the protective relay computational processing at the terminal in question.

In FIG. 2, 1 is the current difference type logic processing section of the protective relay Ry-C; it comprises a microprocessor etc for processing digital data, and has the functions of computational processing means 11 that performs ratio difference computation, and transmission processing means $4_{-1}$, $4_{-2}$, to be later described.

2 is input processing means that inputs the secondary current Ic of the transmission line current flowing at the terminal in question (terminal C) transformed by the current transformer $CT_C$ and that outputs this after performing input processing; it incorporates in its interior an auxiliary current transformer, analogue filter, sample holder, multiplexer, and analogue/digital converter and the like electronic components (electronic circuits); it delivers output to the protective relay Ry-C logic processing section 1 after input processing, such as digitization of the input current IC and digital filtering thereof.

$3_{-1}$ is first reception processing means (FRPM) that performs reception processing on the "current data" transmitted through the communication channel Lca from the protective relay Ry-A of terminal A, designated as "remote terminal 1 (Ry-A) current". $3_{-2}$ is second reception processing means (SRPM) that performs reception processing on the "current data" transmitted through the communication channel Lbc from the protective relay Ry-B of terminal B, designated as "remote terminal 2 (Ry-B) current".

Now the current data "remote terminal 1 (Ry-A current)" received by the first reception processing means 3-1 includes not only the current data Da of the terminal A that was subjected to input processing by the input processing means 2, but also the current data Db that was transmitted to the protective relay Ry-A through the communication channel Lab from the protective relay Ry-B of terminal B as backup data.

Likewise, the "remote terminal 2 (Ry-B current)" received by the second reception processing means $3_{-2}$ includes not only the current data Db of the terminal B that was subjected to input processing by the input processing means 2, but also the current data Da that was transmitted, destined for the protective relay Ry-B, through the communication channel Lab from the protective relay Ry-A of terminal A as backup data.

In this Embodiment 1, at the protective relays Ry-A, Ry-B and Ry-C that are respectively installed at terminal A, terminal B and terminal C, the current data that is input to the first transmission processing means (FTPM) $4_{-1}$ and second transmission processing means (STPM) $4_{-2}$ after being subjected to input processing by the input processing means 2 at the respective terminals in question is defined as "main terminal information"; and, of the current data that is delivered from the remote terminals, the current data that is transmitted for backup purposes by the first transmission processing means $4_{-1}$ and second transmission processing means $4_{-2}$ is defined as "terminal information for backup purposes".

Consequently, when seen from the protective relay Ry-C of FIG. 2, of the current data that is transmitted from the second transmission processing means $4_{-1}$ and destined for the protective relay Ry-B of the remote terminal 2, Dc is the "main terminal information" and Da is the "backup terminal information".

Also, of the current data that is transmitted from the second transmission processing means $4_{-2}$ and destined for the protective relay Ry-A of the remote terminal 1 of FIG. 2, Dc is the "main terminal information" and Db is the "backup terminal information".

Thus, the current data Dc of the terminal in question (terminal C) that is output from the input processing means 2, the main terminal information Da and backup terminal information Db that are output from the first reception processing means $3_{-1}$, and the main terminal information Db and backup terminal information Da that are output from the second reception processing means $3_{-2}$ are input to the computational processing means 11 and the first transmission processing means $4_{-1}$ and second transmission processing means $4_{-2}$, to be described.

The computational processing means 11 performs protective relay computation (current difference computation), using three types of current data, namely, the current data Dc that is output from the input processing means 2 of its own terminal (terminal C), the main terminal information Da that is output from the first reception processing means $3_{-1}$, and the main terminal information Db that is output from the second reception processing means $3_{-2}$. However, if, due to a communication malfunction between the terminals, reception of current data from either of the two remote terminals cannot be achieved, protective relay computation (current difference computation) using the main terminal information of the three terminals cannot be performed. In such a case, the computational processing means 11, on detecting the event that current data has not been input from an arbitrary reception processing means within a predetermined time, performs protective relay computation (current difference computation) using backup terminal information transmitted through a healthy communication channel, instead of the main terminal information, which was not received.

For example, even if, due to a malfunction of the communication channel Lbc between the terminal B and terminal C of FIG. 1, it has become possible for the second reception processing means $3_{-2}$ of FIG. 2 to receive the remote terminal 2 (Ry-B) current i.e. the main terminal information Db of the protective relay Ry-B of the terminal B and the backup terminal information Da, the first reception processing means $3_{-1}$ can still receive the remote terminal 1 (Ry-A) current i.e. the incoming main terminal information Da and backup terminal information Db that are transmitted addressed to the terminal C from the protective relay Ry-A of the terminal A, through the other two healthy communication channels Lab and Lca.

The computational processing means 11 therefore performs protective relay computation (current difference computation), using: the current data Dc of the terminal in question after a predetermined time, as described above; the main terminal information Da that is output from the first reception processing means $3_{-1}$; and the backup terminal information Db that is likewise output from the first reception processing means $3_{-1}$.

Next, the details of the processing performed by the computational processing means 11 will be described. At a typical current difference protective relay, the operating amount (Id) is calculated from the vector sum of the current data of the terminal in question and the current data of the remote terminals, and the suppression amount (Ir) is calculated from the scalar sum of the current data of the terminal in question and the current data of the remote terminals. The ratio difference characteristic is then calculated from the operating amount (Id) and the suppression amount (Ir) that are thus obtained, and used to determine whether or not there is a fault in the protected zone. If it is concluded that there is a fault in the protected zone, an operation signal 101 is output. Although this operation signal 101 may also be used in other logic processes, it is typically employed as a breaker trip signal.

Figure 3:
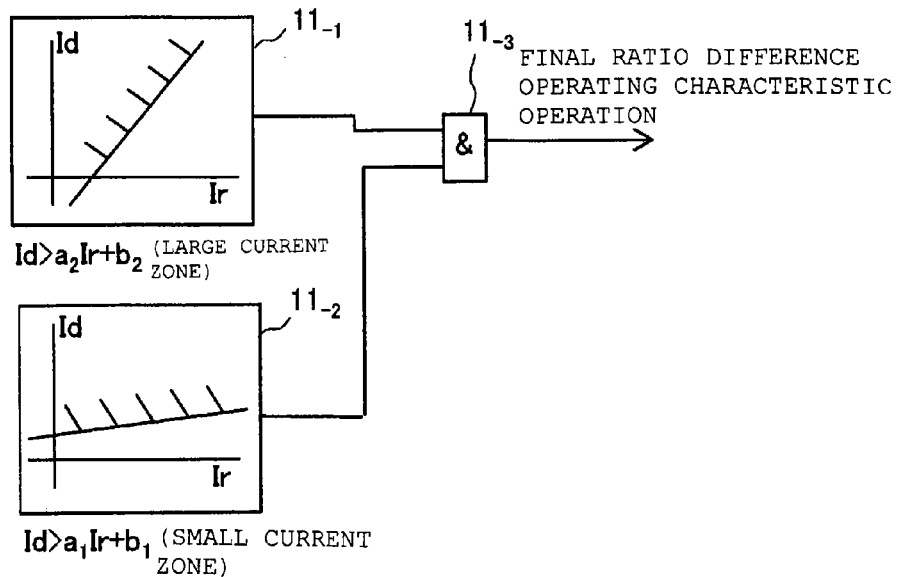
FIG. 3 is a diagram showing an example of the ratio difference characteristic of a current difference protective relay device in Embodiment 1.

FIG. 3 shows the specific content of a ratio difference characteristic produced by the computational processing means 11.

In FIG. 3, this ratio difference characteristic is constituted of a combination of a plurality of characteristics; in the example of FIG. 3, it is constituted by a combination of two characteristics, namely, that of $11_{-1}$ and that of $11_{-2}$.

$11_{-1}$ is a circuit for ascertaining whether or not the operation evaluation expression $Id > a_2 Ir + b_2$ is established. Also, 11-2 is a circuit for ascertaining whether or not the operation evaluation expression $Id > a_1 Ir + b_1$ is established. As regards the relationship between the constants $a_1$, $a_2$, $b_1$, $b_2$ in these operation evaluation expressions, in general, $a_1 \leq a_2$, $b_1 \div b_2$ are set: $11_{-1}$ is called the large current zone and $11_{-2}$ is called the small current zone. $11_{-3}$ is an AND circuit; if the large current zone $11_{-1}$ and small current zone $11_{-2}$ are both established, ratio difference characteristic operation takes place.

Next, the details of operation by the first transmission processing means $4_{-1}$ and the second transmission processing means $4_{-2}$ will be described. The first transmission processing means $4_{-1}$ inputs the current data Dc of the terminal in question processed by the input processing means 2 and the main terminal information Da and backup terminal information Db from the protective relay Ry-A that are output from the first reception processing means $3_{-1}$, and, of these, transmits the current data Dc of the terminal in question as main terminal information and the main terminal information Da received from the protective relay Ry-A as backup terminal information to the protective relay Ry-B of the terminal B. It should be noted that the first transmission processing means $4_{-1}$ is constructed beforehand in such a way that backup terminal information Db received by the first reception processing means $3_{-1}$ is discarded, so that there is no possibility of information transmitted thereto as backup terminal information again being transmitted as "backup terminal information" to another terminal.

Likewise, the second transmission processing means $4_{-2}$ inputs the current data Dc of the terminal in question processed by the input processing means 2 and the main terminal information Db and backup terminal information Da from the protective relay Ry-B that are output from the second reception processing means $3_{-2}$, and, of these, transmits the current data Dc as main terminal information and the current data Db as backup terminal information to the protective relay Ry-A of the terminal A. It should be noted that the second transmission processing means $4_{-2}$ is constructed beforehand in such a way that backup terminal information Da received by the second reception processing means $3_{-2}$ is discarded, so that there is no possibility of information transmitted thereto as backup terminal information being transmitted as "backup terminal information" to another terminal.

Figure 4A:
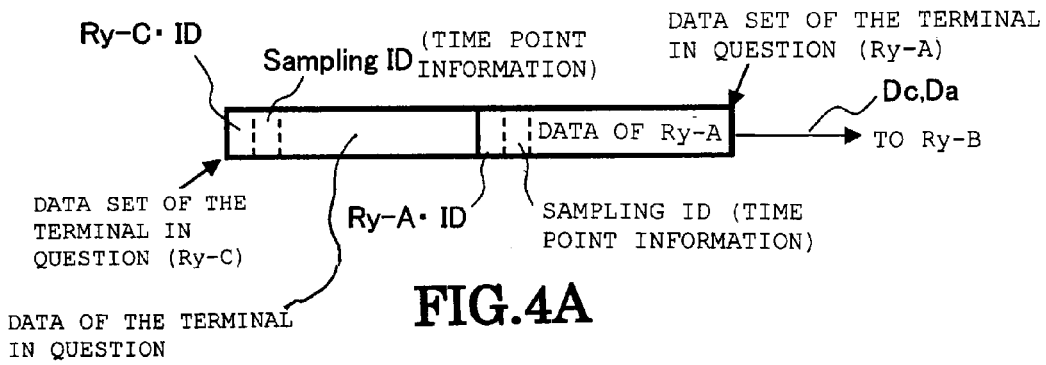
FIG. 4A and FIG. 4B are views showing an example of the organization of the transmission data in Embodiment 1.
Figure 4B:
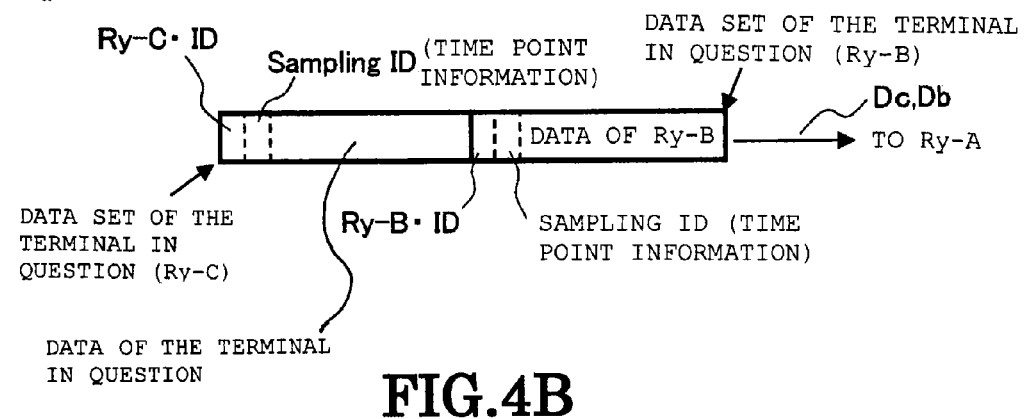

FIG. 4A and FIG. 4B show the pattern of data transmitted to the protective relay of a remote terminal from the protective relay Ry-C of terminal C: a protective relay identification number (ID) determined in addition to the current data is affixed thereto, so that it is possible for the receiving end to know the identity of the terminal from whose protective relay this data has been transmitted. Furthermore, the sampling number and time point data etc are added thereto so that it is possible to know at what time point the data was sampled.

FIG. 4A shows the pattern of the data that is transmitted to the protective relay Ry-B of terminal B from the protective relay Ry-C of terminal C: this pattern comprises: header data constituted by the Ry-C ID following the (Ry-C) data set of the terminal in question, the sampling ID (time point information) and the data of the terminal in question (main terminal information as referred to above); and the (Ry-A) data set of the terminal in question after the succeeding data, constituted by the Ry-A ID, sampling ID (time point information) and Ry-A data (backup terminal information as referred to above).

FIG. 4B shows the pattern of the data that is transmitted to the protective relay Ry-A of terminal A from the protective relay Ry-C of terminal C: this pattern comprises: header data constituted by the Ry-C ID following the (Ry-C) data set of the terminal in question, the sampling ID (time point information) and the data of the terminal in question (main terminal information); and the (Ry-B) data set of the terminal in question after the succeeding data, constituted by the Ry-B ID, sampling ID (time point information) and Ry-B data (backup terminal information).

Thus, the first transmission processing means $4_{-1}$ of the terminal C is constituted so that, in addition to the main terminal information Dc of its own terminal, it also transmits to the protective relay Ry-B of the terminal B, in combination therewith, the current data Da constituting the main terminal information that was transmitted from the protective relay Ry-A of the terminal A as backup terminal information. Likewise, the second transmission processing means $4_{-2}$ of the terminal C is constituted so that, in addition to the main terminal information Dc of its own terminal, it also transmits to the protective relay Ry-A of the terminal A, in combination therewith, the current data Db constituting the main terminal information that was transmitted from the protective relay Ry-B of the terminal B as backup terminal information. Consequently, even if, because of some malfunction on the communication channel Lab or because of some malfunction such as of the transmission means or reception means, the main terminal information Da or backup terminal information Dc from the terminal A cannot be obtained by the protective relay Ry-B installed at the terminal B, which is a remote terminal in regard to terminal C, the main terminal information Dc and the backup terminal information Da can still be received from the protective relay Ry-C of terminal C. Consequently, protective computation (current difference computation) can be performed by substituting the backup terminal information Da transmitted from the protective relay Ry-C of this terminal C for the main terminal information Da of the terminal A, which could not be received.

Since, even if at the protective relay Ry-A installed at the terminal A, the main terminal information Db or backup terminal information Dc cannot be obtained from the terminal B, due to some transmission malfunction of the communication channel Lab, the main terminal information Dc and backup terminal information Db can be received from the protective relay Ry-C of terminal C, protective computation (current difference computation) can be performed by substitution of the backup terminal information Db transmitted from the protective relay Ry-C of this terminal C for the main terminal information Db of terminal B, which could not be received.

However, although, in this Embodiment 1, transmission line protection can continue to be performed even when a data communication malfunction occurs in the communication channel or part of the transmission means or reception means, since transmission of the current data between the terminals is accompanied by a transmission lag time, it cannot be denied that, taking into account this transmission lag time, a time exists in which protection cannot be achieved, albeit for a very slight time, as described below. Hereinafter, a description concerning this time in which protection cannot be achieved is given by insertion of specific numerical values for the transmission lag time.

Let us assume that, as set out hereinafter, the data transmission lag times between the terminals A, B and C are previously measured to be:

(i) transmission lag time between protective relays Ry-A to Ry-B: 5 [ms], (ii) transmission lag time between protective relays Ry-A to Ry-C: 3 [ms], (iii) transmission lag time between protective relays Ry-B to Ry-C: 4 [ms], (iv) processing time for exchange of data at protective relay Ry-C: $\alpha$ [ms].

Under these assumptions, if some of the data could not be received due for example to the occurrence of a data transmission malfunction in the transmission path Lab between the protective relay Ry-A and protective relay Ry-B or in the transmission means or reception means, when current difference computation is performed by the computational processing means 11 by changing over from the current data (main terminal information and/or backup terminal information) transmitted along the transmission path Lab with the transmission malfunction to the current data (main terminal information and/or backup terminal information) transmitted along another healthy transmission path (transmission path passing through the transmission path Lca and transmission path Lbc), the transmission lag time is prolonged by a time (3+4)−5=2 [ms], obtained by subtracting the transmission lag time 5 [ms] of the transmission path Lab from the lag time (3+4) [ms] representing the sum of the transmission lag time 3 [ms] of the transmission path Lca and the transmission line time 4 [ms] of the transmission path Lbc.

The delay time (2+$\alpha$) [ms] obtained by adding the delay time 2 [ms] resulting from changing over to the current data on this healthy transmission path and the processing time $\alpha$ [ms] involved in exchanging data with the protective relay Ry-C represents the time for which protection cannot be achieved, because of communication malfunction. However, since, after the lapse of this time (2+$\alpha$) [ms], both the protective relay Ry-A and the protective relay Ry-B can continue to use data through the protective relay Ry-C, continued use of the transmission line protective relay device can be achieved.

As described above, with this Embodiment 1, when terminal information is transmitted to the protective relay (Ry-A) of the remote terminal (terminal A) that is the destination of transmission from the protective relay (Ry-C) of the terminal in question (terminal C), it is arranged that the terminal information Db that was transmitted from the protective relay (Ry-B) of a remote terminal (terminal B) different from the transmission destination is combined with the main terminal information Da generated at the terminal in question, and transmitted, if some data transmission malfunction has occurred on the transmission path Lca between terminal C and terminal A, the terminal information transmitted thereto through the other transmission path Lab and the transmission path Lbc between the terminal B and the terminal C of the protective relay (Ry-B) of the remote terminal (terminal B) different from the transmission destination can still be utilized, so transmission line protection continuation can be achieved with the effect of communication malfunction reduced to the minimum.

Consequently, the characteristic benefits are obtained that communication and the utilization rate of the protective relays can be improved and, in addition, since, with this Embodiment 1, the data transmission system in the event of communication malfunction is not altered, as it was in the prior art, processing is straightforward and easily comprehensible.

Embodiment 2

A transmission line protective relay device according to this Embodiment 2 is described below with reference to FIG. 1 and FIG. 5 to FIG. 8. The difference between this Embodiment 2 and Embodiment 1 described above lies in that the "current differential relay device" of Embodiment 1 is substituted by a "directional comparative distance relay device". It should be noted that the structure (construction) of the transmission line and communication path in itself is the same as the Embodiment 1 since this Embodiment 2 also recites FIG. 1.

Hereinafter, the directional comparative distance relay device Ry-C installed at terminal C will be described with reference to FIG. 5; however, the directional comparative distance relay device Ry-A of terminal A installed at the remote terminal 1 and the directional comparative distance relay device Ry-B of terminal B installed at the remote terminal 2 are of exactly the same construction. In the following description, the "directional comparative distance relay devices" will be abbreviated to "protective relays".

Figure 5:
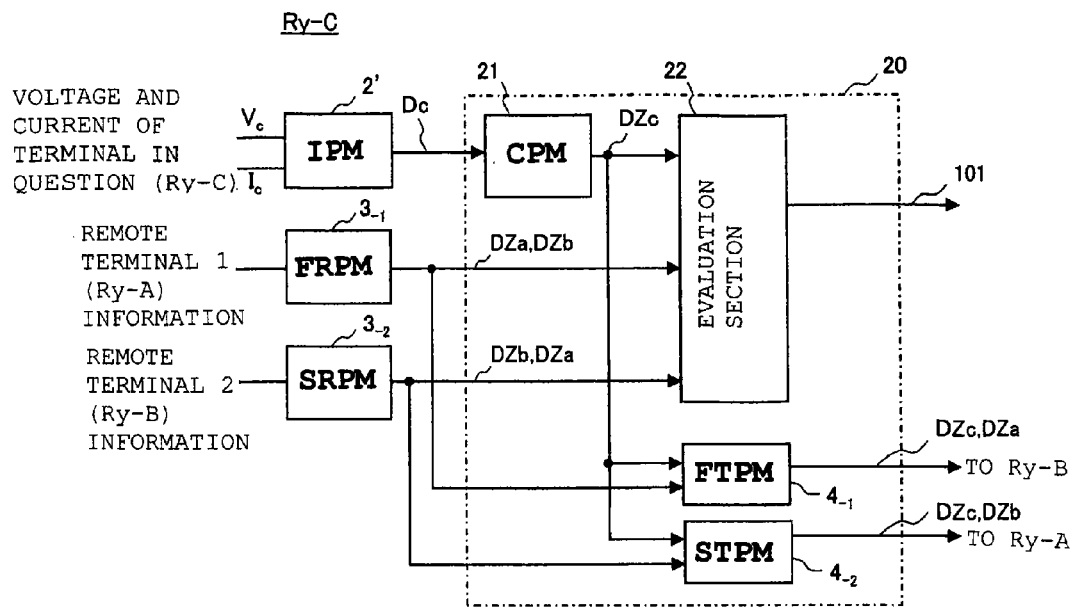
FIG. 5 is a logic diagram showing an example of the internal processing in Embodiment 2 of the present invention when a directional comparative distance relay device is employed as a transmission line protective relay device.

In FIG. 5, 20 is the logic processing section of the protective relay Ry-C that is constituted by a microprocessor for processing digital data and incorporates: computational processing means ("computational processing means (CPM)") 21; a final operation decision section ("decision section") 22; and transmission processing means $4_{-1}$, $4_{-2}$. These internal processing means will be further described below.

2' is input processing means for input processing of the voltage Vc and current Ic of the terminal in question after these have been respectively transformed by an instrument voltage transformer (VT) and instrument current transformer $CT_C$, not shown; just as in the case of the input processing means 21 of Embodiment 1, it incorporates in its interior an auxiliary current transformer, analogue filter, sample holder, multiplexer, analogue/digital converter and the like electronic components (electronic circuits); after input processing such as digitization and digital filtering of the input voltage Vc and current Ic, it outputs digital data Dc to the computational processing means 21 in the logic processing section 20.

$3_{-1}$ is first reception processing means that performs reception processing of "information" transmitted through the communication channel Lca (FIG. 1) from the protective relay Ry-A of terminal A, denoted by "remote terminal 1 (Ry-A) information"; $3_{-2}$ is second reception processing means that performs reception processing of "information" transmitted through the communication channel Lbc (FIG. 1) from the protective relay Ry-B of terminal B, denoted by "remote terminal 2 (Ry-B) information".

In the "remote terminal 1 (Ry-A) information" that is received by the first reception processing means $3_{-1}$, in addition to the "evaluation result signal" DZa evaluated by the protective relay (Ry-A) of terminal A, for backup purposes, there is included an "evaluation result signal" DZb evaluated by the protective relay (Ry-B) of terminal B and transmitted by the protective relay (Ry-A) through the communication channel Lab.

Likewise, in the "remote terminal 2 (Ry-B) information" that is received by the second reception processing means $3_{-2}$, in addition to the "evaluation result signal" DZb evaluated by the protective relay (Ry-A) of terminal B, for backup purposes, there is included an "evaluation result signal" DZa evaluated by the protective relay (Ry-A) of terminal A and transmitted by the protective relay (Ry-B) through the communication channel Lab.

The aforementioned computational processing means 21 performs distance relay computation processing, from the voltage/current of the terminal in question, and outputs a computation result signal (hereinafter called "computation result signal") DZc. The "computation result signal" DZc of the terminal in question (terminal C) output from the computational processing means 21, the main terminal information DZa and backup terminal information DZb that are output from the first reception processing means $3_{-1}$, and the main terminal information DZb and backup terminal information DZa that are output from the second reception processing means $3_{-2}$ are input to the computational processing means 11 and the first transmission processing means $4_{-1}$ and the second transmission processing means $4_{-2}$, to be later described.

Figure 6:
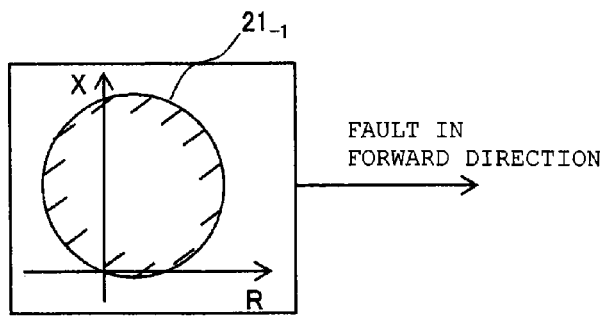
FIG. 6 is a detail view relating to the computation section in the logic of the direction of comparative distance relay device in Embodiment 2.

FIG. 6 shows an example of a typical characteristic obtained by distance relay computation performed by the computational processing means 21. In FIG. 6, if the impedance found from the voltage Vc and current Ic of the terminal in question is within the operating area of the Mho relay (portion indicated by shading), this is evaluated as "fault point present" in the forward direction; if this impedance is not within the operating area, this is evaluated as "no fault point" in the forward direction. It should be noted that the distance relay characteristic and/or computation formula, and shape of the operating area etc may have various different forms, which are not restricted to the Mho relay shown.

In this Embodiment 2, at the protective relays Ry-A, Ry-B, Ry-C, the "evaluation result signal" DZ that is output from the computational processing means 21 of the respective terminal in question and respectively input to the final operation evaluation section 22 and first transmission processing means $4_{-1}$ and second transmission processing means $4_{-2}$ is defined as the "main terminal information" DZ; and, of the "evaluation result signals" delivered from the remote terminals, the "evaluation result signal" DZ that is transmitted for backup purposes by the first transmission processing means $4_{-1}$ and second transmission processing means $4_{-2}$ is defined as the "backup terminal information" DZ.

Consequently, when seen from the protective relay Ry-C of FIG. 5, of the "evaluation result signals" that are transmitted addressed to the protective relay Ry-B of the remote terminal 2 from the first transmission processing means $4_{-1}$, DZc is the "main terminal information" and DZa is the "backup terminal information". Also, of the "evaluation result signals" that are transmitted addressed to the protective relay Ry-A of the remote terminal 1 from the first transmission processing means $4_{-2}$, DZc is the "main terminal information" and DZb is the "backup terminal information".

The final operation evaluation section 22 inputs the "main terminal information" DZc of the terminal in question, and the "main terminal information" DZa of the terminal A that is output from the first reception processing means $3_{-1}$ and the "main terminal information" DZb of the terminal B that is output from the second processing means $3_{-2}$; if all of the items of "main terminal information" of all of the terminals are evaluated as "forward direction", this final operation evaluation section 22 makes a final evaluation of "internal fault"; however, if even one of these is evaluated as "rearward direction", it makes a final evaluation of "external fault". However, if the main terminal information from any one of the remote terminals, of the two remote terminals, cannot be received, due to some communication malfunction, a protective relay computation (directional comparative computation) cannot be performed using the main terminal information of all the terminals. In this case, the computational processing means 11 detects the event that the main terminal information was not input from an arbitrary reception processing means within a predetermined time, and performs protective relay computation (directional comparative computation) using, instead of the main terminal information that could not be received, "backup terminal information" transmitted through a healthy communication channel.

Next, the details of the processing performed by the first transmission processing means $4_{-1}$ and second transmission processing means $4_{-2}$ will be described.

The first transmission processing means $4_{-1}$ inputs the "evaluation result signal" DZc of the terminal in question that was output from the basic computational processing means 21 and the remote terminal 1 information that was received by the first reception processing means $3_{-1}$ ("evaluation result signal" DZa delivered from terminal A and the "evaluation result signal" DZb), and, of these, taking the evaluation result signal of its own terminal as being the "main terminal information" DZc, transmits the evaluation result signal from terminal A to the protective relay Ry-B of the terminal B as "backup terminal information" DZa. It should be noted that, due to the first transmission processing means $4_{-1}$ being constructed beforehand so that the backup terminal information DZb received by the first reception processing means $3_{-1}$ is discarded, there is no possibility of the information transmitted as backup terminal information again being transmitted to another terminal as "backup terminal information".

Likewise, the second transmission processing means $4_{-2}$ inputs the "evaluation result signal" DZc of the terminal in question that was output from the basic computational processing means 21 and the remote terminal 2 information that was received by the second reception processing means $3_{-2}$ ("evaluation result signal" DZb delivered from terminal B and the "evaluation result signal" DZa), and, of these, taking the evaluation result signal of its own terminal as being the "main terminal information" DZc, transmits the evaluation result signal from terminal B to the protective relay Ry-A of the terminal A as "backup terminal information" DZb. It should be noted that, due to the second transmission processing means $4_{-2}$ being constructed beforehand so that the backup terminal information DZa received by the second reception processing means $3_{-2}$ is discarded, there is no possibility of the information transmitted as backup terminal information again being transmitted to another terminal as "backup terminal information".

Figure 7A:
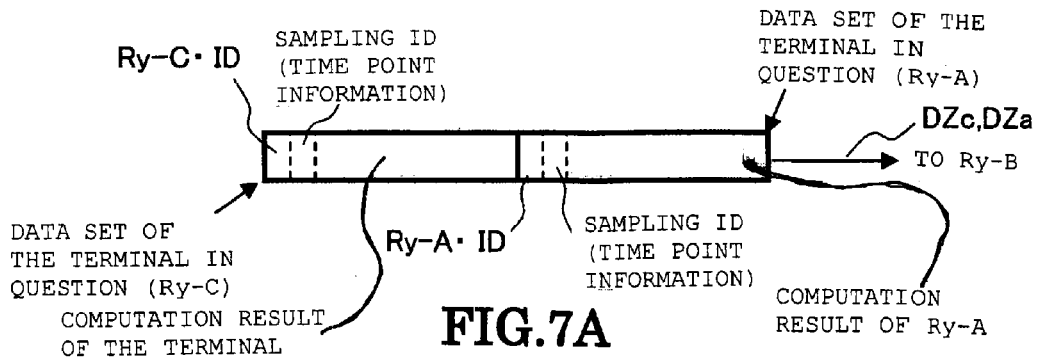
FIG. 7A and FIG. 7B are views showing an example of the organization of transmission data in Embodiment 2.
Figure 7B:
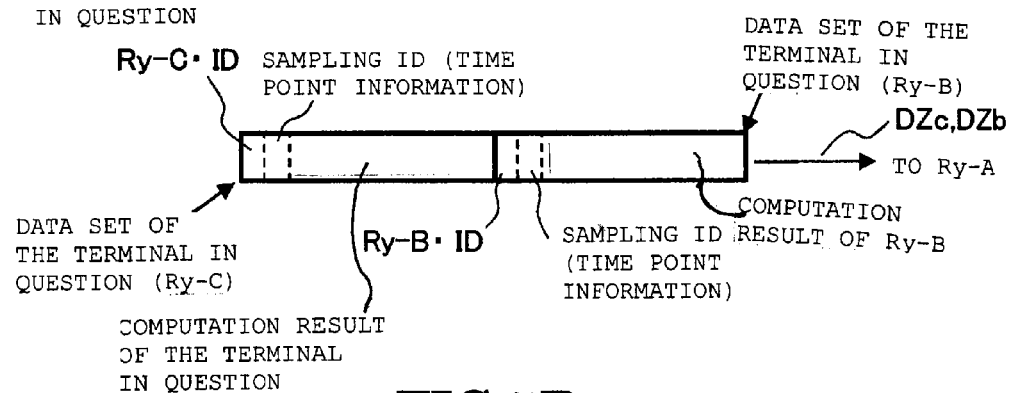

FIG. 7A and FIG. 7B show the pattern of the data that is transmitted to the remote terminal from the protective relay Ry-C of terminal C: in addition to the computation results, the identification number (ID) of the protective relay by which they were measured is attached, so that it is possible for the receiving end to tell from which protective relay the data were transmitted. In addition, sample number and time point data etc are attached so that it is possible to tell at what time point the data were sampled.

FIG. 7A shows the pattern of data transmitted to the protective relay Ry-B of terminal B from the protective relay Ry-C of terminal C: this comprises header data constituted by the Ry-C ID following the (Ry-C) data set of the terminal in question, the sampling ID (time point information) and the computation result of the terminal in question; and the (Ry-A) data set of the terminal in question after the succeeding data, constituted by the Ry-A ID, sampling ID (time point information) and Ry-A computation result.

FIG. 7B shows the pattern of data transmitted to the protective relay Ry-A of terminal A from the protective relay Ry-C of terminal C: this comprises header data constituted by the Ry-C ID following the (Ry-C) data set of the terminal in question, the sampling ID (time point information) and the computation result of the terminal in question; and the (Ry-B) data set of the terminal in question after the succeeding data, constituted by the Ry-B ID, sampling ID (time point information) and Ry-B computation result.

Consequently, if the basic computational processing means 21 of the protective relay Ry-C concludes that there is a fault in the forward direction, it sends a "forward fault signal" to the protective relay Ry-B of terminal B from the first transmission processing means $4_{-1}$ and, in addition, sends a "forward fault signal" to the protective relay Ry-A of terminal A from the second transmission processing means $4_{-2}$.

On the other hand, if the basic computational processing means 21 of the protective relay Ry-C concludes that the fault is to the rear of the protected zone, it may send a "trip blocking signal" to the remote party. A "trip enabling signal" or "trip blocking signal" will also be sent from a remote terminal, depending on whether the fault point is to the front or to the rear.

Figure 8:
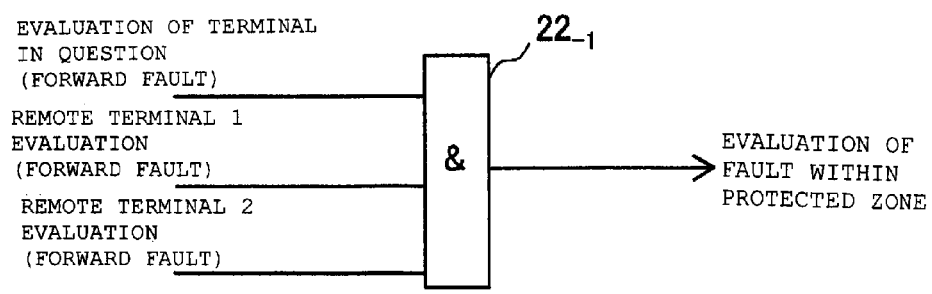
FIG. 8 is a detail view relating to a fault evaluation section of the directional comparative distance relay device of Embodiment 2.

FIG. 8 shows typical evaluation logic of the final operation evaluation section 22.

In the final operation evaluation section 22 of FIG. 8, $22_{-1}$ is an AND circuit; if the protective relays of all three terminals identify a "forward fault", the AND condition is established, and a fault is identified in the protected zone: a breaker trip signal 101 is therefore output from the protective relay Ry-C. This signal 101 may also be used by other logic circuits.

As described above, with this Embodiment 2, in the directional comparative distance relay devices, at all of the terminals, the evaluation result signal of the terminal in question is identified as the main terminal information and the evaluation result signals arriving from remote terminals are identified as backup terminal information, these are combined therewith and transmitted to the remote terminals. If the transmitted signal is normal, final operation evaluation is conducted based on the main terminal information. If there is a malfunction in a part of the transmission path, the final operation evaluation is conducted using the backup terminal information instead of the main terminal information that could not be received. Consequently, transmission line protection is continued in the same way as in Embodiment 1, with the effect of transmission malfunction reduced to the minimum.

The rate of utilization of communication and the protective relays can thereby be improved. In addition, since, with this Embodiment 1, the data transmission system in the event of communication malfunction is not altered, as it was in the prior art, there is the characteristic advantage that processing is straightforward and easily comprehensible.

Embodiment 3

Embodiment 3 is described below with reference to FIG. 9 and FIG. 10.

This Embodiment 3 is an Embodiment in which, just as in the case of Embodiment 1, current differential relay devices are employed as the transmission line protective relay devices; however, by increasing the terminal number of the transmission line (sum (1+N=X) of the terminal in question and the number of remote terminals) from 3 to X, the internal reception processing means and transmission processing means in the current differential relay devices are increased. Disregarding the internal processing, the layout of the transmission line and the communication channels is, in itself, the same as in the case of Embodiment 2.

Figure 9:
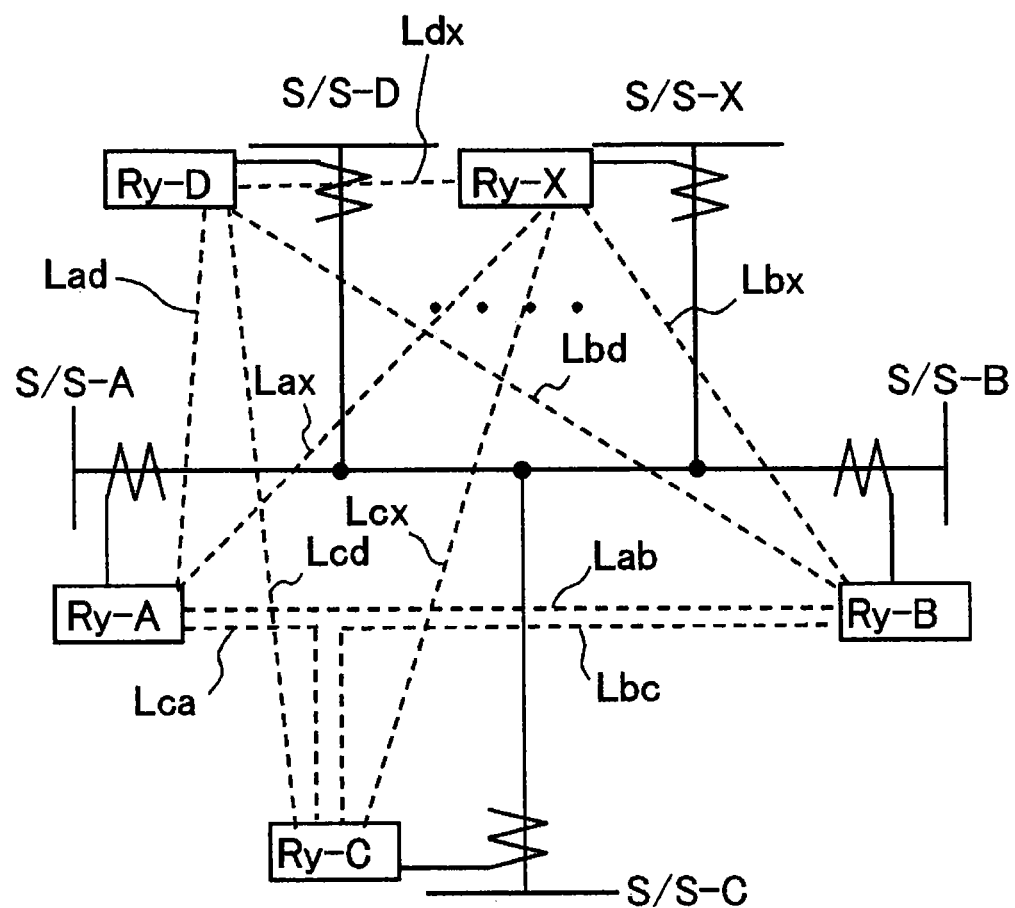
FIG. 9 is a view showing the organization of a transmission line with at least five terminals and a communication channel in Embodiment 3 of the present invention.

In FIG. 9, between terminal A, terminal B, terminal C, terminal D . . . terminal X, in addition to the communication channels Lab, Lbc, Lca referred to above, connection is effected by means of Lad, Lbd, Lcd, . . . Lax, Lbx, Lcx, Ldx.

Figure 10:
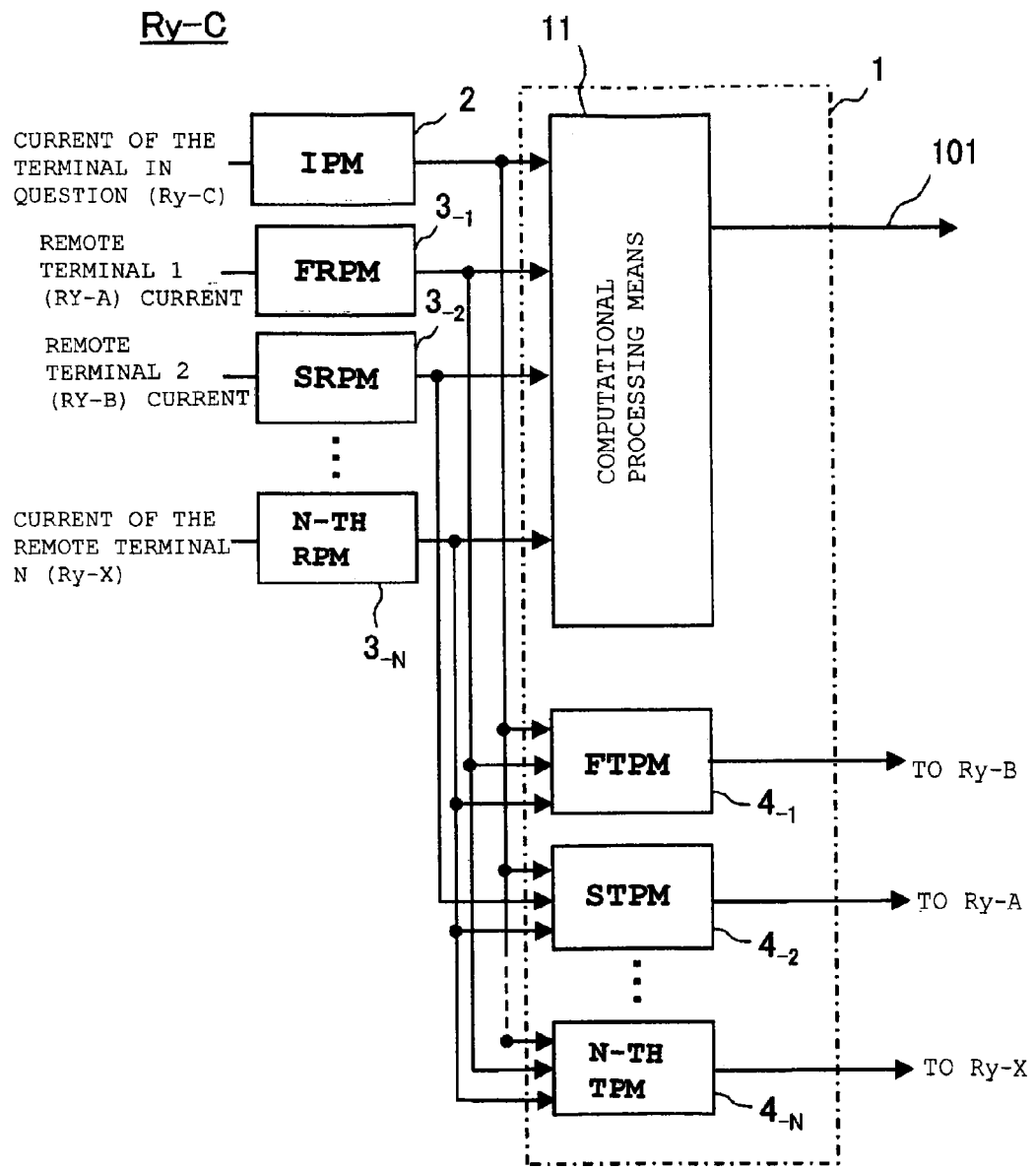
FIG. 10 is a logic diagram showing an example of the internal processing in Embodiment 3 when a current difference protective relay device is employed as a transmission line protective relay device.

FIG. 10 is a logic layout diagram showing the internal processing of the protective relay Ry-C corresponding to the logic layout diagram of FIG. 2 in Embodiment 1. Compared with FIG. 2, in FIG. 10, the reception processing means and transmission processing means are increased by the number with which the number of terminals was increased: other details are the same. Specifically, as reception processing means, there are provided reception processing means $3_{-1}$, $3_{-2}$, . . . $3_{-N}$, and as transmission processing means, there are provided transmission processing means $4_{-1}, 4_{-2}, \ldots 4_{-N}$.

Just as in the case of FIG. 2, the first reception processing means $3_{-1}$, . . . N-th reception processing means (N-TH RPM) $3_{-N}$ perform reception processing of data that is sent from the remote terminals, and hand over this reception-processed data to the computational processing means 11, and first transmission processing means $4_{-1}$ to N-th transmission processing means (N-TH TPM) $4_{-N}$.

The first transmission processing means $4_{-1}$ sends the data (all the data of the terminal protective relay Ry-C in question, the protective relay Ry-A, the protective relay Ry-D, protective relay Ry-X) of all the terminals except the data of the protective relay Ry-B, to the protective relay Ry-B.

The second transmission processing means $4_{-2}$ sends the data (the data of the terminal protective relay Ry-C in question, the protective relay Ry-B, the protective relay Ry-D, . . . protective relay Ry-X) of all the terminals except the data of the protective relay Ry-A, to the protective relay Ry-A.

Likewise, the N-th transmission processing means $4_{-1}$ sends the data (the data of the terminal protective relay Ry-C in question, the protective relay Ry-A, the protective relay Ry-B, and the protective relay Ry-D, . . . ) of all the terminals except the data of the protective relay Ry-X, to the protective relay Ry-X. The rest of the processing after the data has been received is same as in the case of Embodiment 1, so a description thereof is omitted.

Thus, with this Embodiment 3, by delivering data to each terminal, even if a particular communication channel becomes unusable, just as in the case of Embodiment 1, the necessary data can be acquired via another terminal and so can continue to be available for subsequent use. As a result, the utilization rate of the protection can be improved. Although, if all the data are transmitted in this way, the amount of transmitted data becomes larger, there is the advantage that even if a plurality of communication channels malfunction, computation can still be continued.

Embodiment 4

A transmission line protective relay device according to Embodiment 4 is described below with reference to FIG. 9, FIG. 11 and FIG. 12. This Embodiment 4 is an Embodiment in which, just as in the case of Embodiment 2, directional comparative distance relay devices are employed as the transmission line protective relay devices; however, by increasing the terminal number of the transmission line (sum (1+N=X) of the terminal in question and the number of remote terminals) from 3 to X, the internal reception processing means and transmission processing means in the directional comparative distance relay devices are increased.

Disregarding the internal processing, the layout of the transmission line and the communication channels is, in itself, the same as in the case of Embodiment 2.

Figure 11:
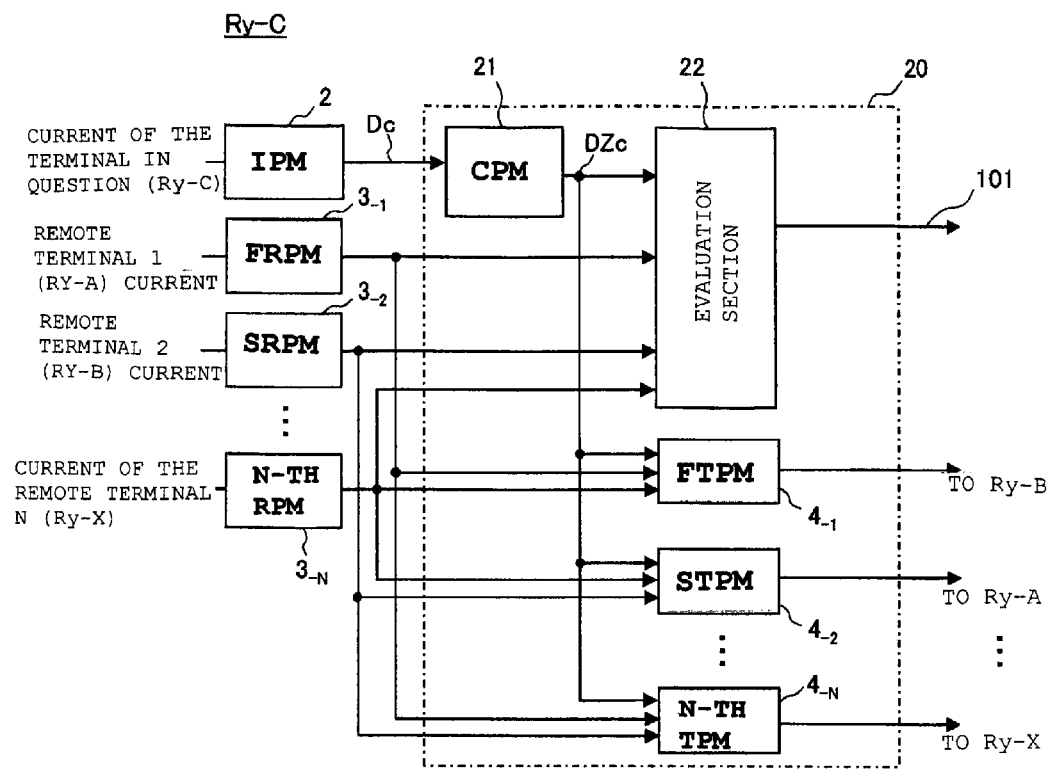
FIG. 11 is a logic diagram showing an example of the internal processing in Embodiment 4 of the present invention when a directional comparative distance relay device is employed as a transmission line protective relay device.
Figure 12:
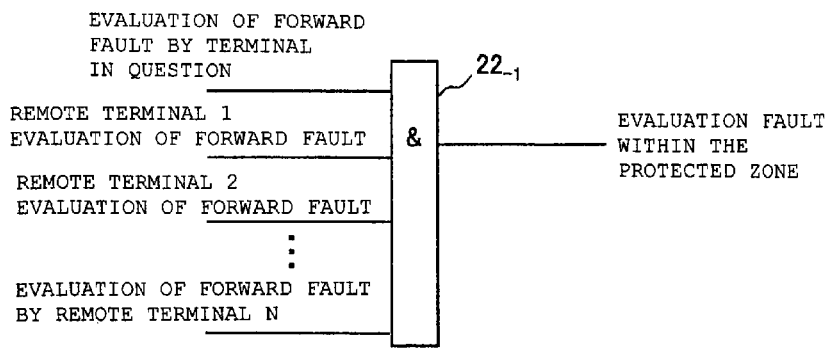
FIG. 12 is a detail view relating to an evaluation section in the logic of the directional comparative distance relay device in Embodiment 4.

Regarding the internal processing of FIG. 11, the number of reception processing means and transmission processing means is increased by the number of remote terminals, compared with the internal processing of FIG. 5. Specifically, as the reception processing means, there are provided a first reception processing means $3_{-1}$, second reception processing means $3_{-2}$, ... N-th reception processing means $3_{-N}$; and as the transmission processing means, there are provided a first transmission processing means $4_{-1}$, second transmission processing means $4_{-2}$, ... N-th transmission processing means $4_{-N}$. In this case, the total number of terminals X is the sum (1+N) of the terminal in question and the number of remote terminals.

Just as in the case of FIG. 2, the first reception processing means $3_{-1}$, ... N-th reception processing means $3_{-N}$ perform reception processing of data that is sent from the remote terminals, and hand over this reception-processed data to the computational processing means 11, and first transmission processing means $4_{-1}$ to N-th transmission processing means $4_{-N}$.

The first transmission processing means $4_{-1}$ sends the data (all the data of the terminal protective relay Ry-C in question, the protective relay Ry-A, the protective relay Ry-D, ... protective relay Ry-X) of all the terminals except the data of the protective relay Ry-B, to the protective relay Ry-B.

The second transmission processing means $4_{-2}$ sends the data (the data of the terminal protective relay Ry-C in question, the protective relay Ry-B, the protective relay Ry-D, ... protective relay Ry-X) of all the terminals except the data of the protective relay Ry-A, to the protective relay Ry-A.

Likewise, the N-th transmission processing means $4_{-N}$ sends the data (the data of the terminal protective relay Ry-C in question, the protective relay Ry-A, the protective relay Ry-B, and the protective relay Ry-D, ... ) of all the terminals except the data of the protective relay Ry-X, to the protective relay Ry-X.

The rest of the processing after the data has been received is same as in the case of Embodiment 2. Since the number of signals that are ANDed is increased due to the increase in the number of terminals, the logic section $22_{-1}$ of the final operation decision section 22 therein is as shown in FIG. 12, but the basic concept is the same as in the case of FIG. 8.

Thus, by delivering data to remote terminals, even if a particular communication channel should become unusable, just as in the case of Embodiment 2, the necessary data can be acquired via another terminal and so can continue to be available for subsequent use. As a result, the utilization rate of the protection can be improved. Although, if all the data are transmitted in this way, the amount of transmitted data becomes larger, there is the advantage that even if a plurality of communication channels malfunction, computation can still be continued.

Embodiment 5

A transmission line protective relay device according to Embodiment 5 is described below with reference to FIG. 13.

This Embodiment 5 is based on the current differential relay device of Embodiment 3 or directional comparative distance relay device of Embodiment 4 described above, and the number of reception processing means, the number of transmission processing means and the processing as far as the reception processing and the processing after reception of data etc are the same; however, it differs in that a construction is adopted whereby the number of items of data that are transmitted from each of the transmission processing means (first transmission processing means $4_{-1}$, second transmission processing means $4_{-2}$, ... N-th transmission processing means $4_{-N}$) and the amount of remote terminal data other than the data of the terminal in question are reduced.

Figures 13, 14:
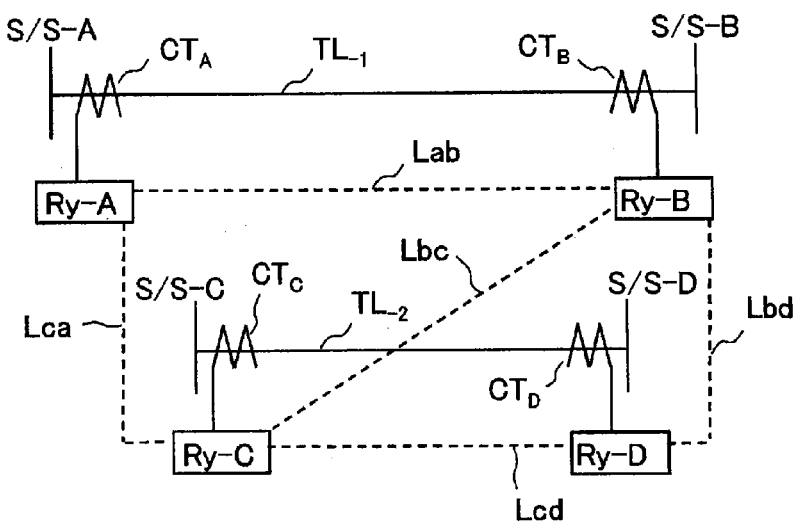
FIG. 13 is a view displaying combination of transmission data in Embodiment 5 of the present invention.
FIG. 14 is a view showing the layout of a transmission line and the organization of communication channels in Embodiment 7 of the present invention.

FIG. 13 shows an example of the combination of data transmitted from each terminal, in the case of 4 terminals, comprising terminal A, terminal B, terminal C and terminal D.

For example, focusing on terminal C as the transmission source, apart from the terminal data of the terminal in question, the data of the protective relay Ry-B of terminal B is delivered from the protective relay Ry-C to the protective relay Ry-A of the terminal A, constituting the first delivery destination terminal; apart from the terminal data of the terminal in question, the data of the protective relay Ry-A of terminal A is delivered to the terminal B, constituting the second delivery destination terminal; and apart from the terminal data of the terminal in question, the data of the protective relay Ry-D of terminal A is delivered to the terminal D, constituting the third delivery destination terminal. Likewise, in the case of the protective relay Ry-A of terminal A, the protective relay Ry-B of terminal B, and the protective relay Ry-D of terminal D which constitute the other delivery sources, apart from the data of the terminal in question, the data of the other terminals is also delivered in combination therewith to the delivery destination.

Thus, in FIG. 13, it is arranged that, apart from the data of the terminal in question, the data corresponding to two terminals, i.e. one less than the number 3 of remote terminals, is transmitted, and, from the respective three transmission processing means, data corresponding to a total of three terminals is transmitted. Consequently, even if there is a communication channel malfunction on two routes, the data continues to be available for use.

Thus, with this Embodiment 5, by appropriately selecting the combination of transmission data by arranging to deliver, as the transmission data, data corresponding to a total of two terminals, by adding the data of one terminal i.e. a remote terminal to the data of the terminal in question, even if the communication channels of two routes have become unusable, just as in the case of Embodiment 1, the necessary data can be acquired via another terminal and thus continue to be available for subsequent use. As a result, the utilization rate of protection can be improved.

Embodiment 6

A sixth Embodiment is described below.

This Embodiment 6 is characterized in that the construction of the transmission means in Embodiment 1, Embodiment 3 or Embodiment 4 and the organization of the transmitted data shown in FIG. 4A and FIG. 4B or FIG. 7A and FIG. 7B are altered: other aspects are the same as in the case of Embodiment 1, Embodiment 3 or Embodiment 4.

This Embodiment 6 is constructed so that, instead of combining the data received from a remote terminal with the data from the terminal in question, as in Embodiment 1 to Embodiment 5, the data from the terminal in question is, on its own, first of all delivered to the remote terminal and then data received from the remote terminal is delivered to another remote terminal.

For example, the protective relay Ry-C of terminal C first of all delivers the data of its own terminal to the protective relay Ry-A of terminal A. At this point, the data of the protective relay Ry-B from terminal B has not yet been received. When, subsequently, the data of the protective relay Ry-B is received from terminal B, this data of the protective relay Ry-B is immediately delivered to the protective relay Ry-A of terminal A. In the case of the protective relay Ry-B, when the data of the terminal in question (protective relay Ry-C) is likewise first of all delivered on its own to this protective relay Ry-B, and then the data of the protective relay Ry-A of terminal A is subsequently received, immediately thereafter, the data of the protective relay Ry-A of terminal A that was received is delivered to protective relay Ry-B. The processing after reception of data is the same as in the case of Embodiment 1, so a description thereof is dispensed with.

If the data is individually delivered in this way, for example the delay in transmission of data of the protective relay Ry-A sent to the protective relay Ry-B can be reduced to the minimum, so the processing time α [ms] in Embodiment 1 to Embodiment 5 can be made somewhat shorter. If, as in Embodiment 1, the data of the protective relay Ry-A is delivered in combination with the data of the terminal in question (protective relay Ry-C), a waiting time is generated that is required for the preparation of the next protective relay Ry-C data to be achieved after reception by the protective relay Ry-A: however, in the case of the present Embodiment 6, the waiting time for the data to be delivered from the remote terminal can be eliminated, since the data is individually delivered. However, it cannot be denied that the frequency of data transmission is to that extent increased.

Embodiment 7

Figure 15:
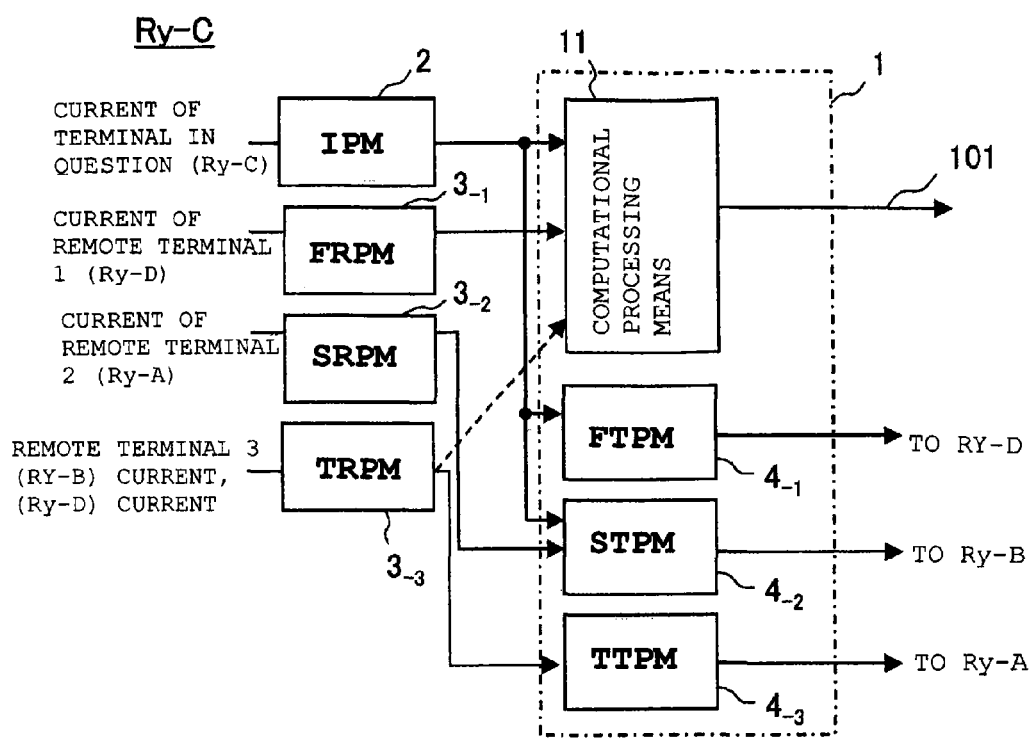
FIG. 15 is a logic diagram showing the internal processing of a current difference protective relay device in Embodiment 7 of the present invention.

Embodiment 7 is described below with reference to FIG. 14 and FIG. 15. FIG. 14 is a view showing the transmission line layout and organization of communication channels in Embodiment 7 of the present invention; FIG. 15 is a logic diagram showing the internal processing of a current difference protective relay device in Embodiment 7 of the present invention, constituting a typical example of the processing of the protective relay Ry-C.

In this Embodiment 7, as shown in FIG. 14 and FIG. 15, a single transmission line $TL_{-1}$ is protected by the protective relay Ry-A and protective relay Ry-B; another transmission line $TL_{-2}$ is protected by the protective relay Ry-C and protective relay Ry-D.

The correspondence relationship of FIG. 14 and FIG. 15 will now be described. Ry-C, Ry-D, Ry-A and Ry-B of FIG. 14 respectively correspond to the terminal in question, remote terminal 1, remote terminal 2 and remote terminal 3 of FIG. 15.

In the protective relay Ry-C, the current data of the terminal in question (Ry-C) that has been processed by the input processing means 2 of the terminal in question is introduced to the computational processing means 11 and is input to the first transmission processing means $4_{-1}$ and second transmission processing means $4_{-2}$. Although the current data of the remote terminal 1 (Ry-D) received by the first reception processing means $3_{-1}$ through the communication channel Lcd is introduced into the computational processing means 11, it is not transmitted to the remote terminal 1.

The current data of the remote terminal 2 (Ry-A) received by the first reception processing means $3_{-2}$ through the communication channel Lca is input to the second transmission processing means $4_{-2}$ without being employed for protection computation by the computational processing means 11. The data of the protective relays Ry-B and Ry-D received by the third reception processing means (TRPM) $3_{-3}$ through the communication channel Lbc is input to the third transmission processing means (TTPM) $4_{-3}$. It should be noted that, of the data of the protective relay Ry-B and Ry-D, only the data of Ry-D is introduced to the computational processing means 11.

The first transmission processing means $4_{-1}$ transmits the input current data to the protective relay Ry-D through the communication channel Lcd. The second transmission processing means $4_{-2}$ transmits the input current data of the remote terminal 2 (Ry-A) received by the terminal in question and the second reception processing means $3_{-2}$ to the protective relay Ry-B through the communication channel Lbc. The third transmission processing means $4_{-3}$ transmits the data of the protective relay Ry-D and Ry-B that is received by the third reception processing means through the communication channel Lca to the protective relay Ry-A. The current data that is transmitted from these second transmission processing means $4_{-2}$ and third transmission processing means $4_{-3}$ is employed for backup purposes when transmission of current data between Ry-A and Ry-B cannot be achieved, due to some communication malfunction on the communication channel Lab.

The computational processing means 11 basically performs current difference computation using only the current data of the terminal in question (Ry-C) and the current data of the remote terminal 1 (Ry-D), but, in cases where the current data of the remote terminal 1 (Ry-D) cannot be received, due to the occurrence of some malfunction of the communication channel Lcd, inputs the current data (Ry-D) which is data transmitted from the remote terminal 3 (Ry-B) and received by the third reception processing means $3_{-3}$ for backup purposes.

In this way, with this Embodiment 7, reliability of communication is improved by delivering backup data through a protective relay that protects another transmission line: in this way, the protective relay utilization rate can be improved.

Embodiment 8

Embodiment 8 is described below with reference to FIG. 14 and FIG. 16.

Figure 16:
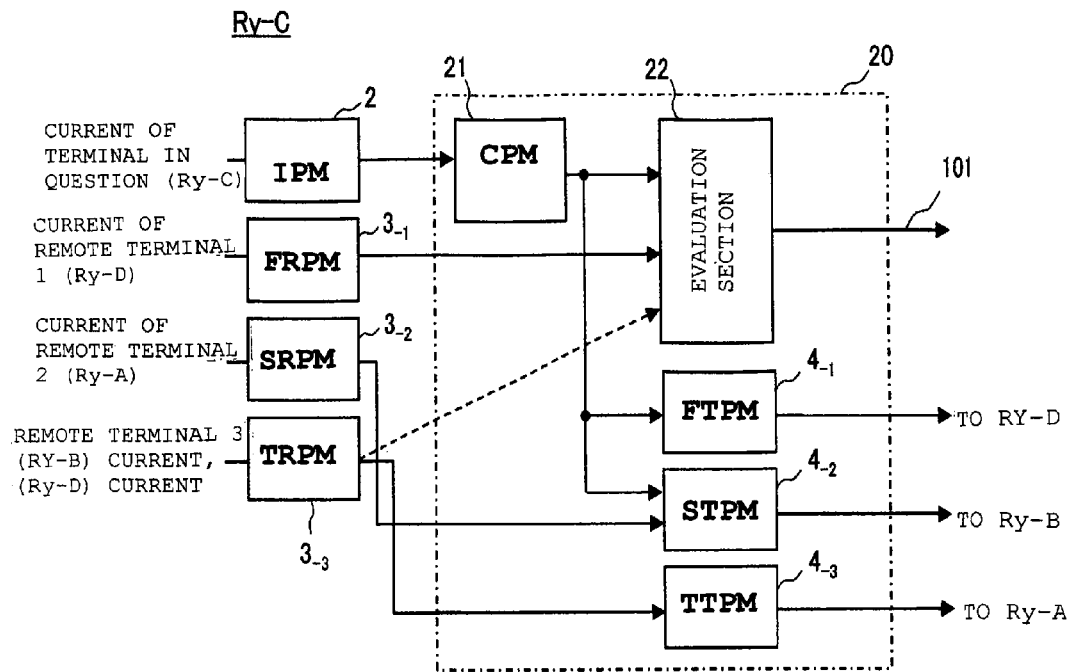
FIG. 16 is a view showing the logic of a directional comparative distance relay device in Embodiment 8 of the present invention.

FIG. 16 is a view showing the logic of a directional comparative distance relay device in Embodiment 8 of the present invention.

The aspect in which this Embodiment 8 differs from Embodiment 7 described above is that the type of transmission line protective relay device used is changed from a current difference protective relay device to a directional comparative distance relay device. It should be noted that the construction and functions of the basic internal means used in the processing means 20 of a directional comparative distance relay device can be inferred from FIG. 11 and FIG. 15, which have already been described, so a description thereof is dispensed with.

Thus, with this Embodiment 8, the reliability of communication is improved by delivering the data through a protective relay that protects another transmission line: the utilization rate of the protective relays can thereby be improved.

Embodiment 9

Embodiment 9 is described below with reference to FIG. 17.

Figure 17:
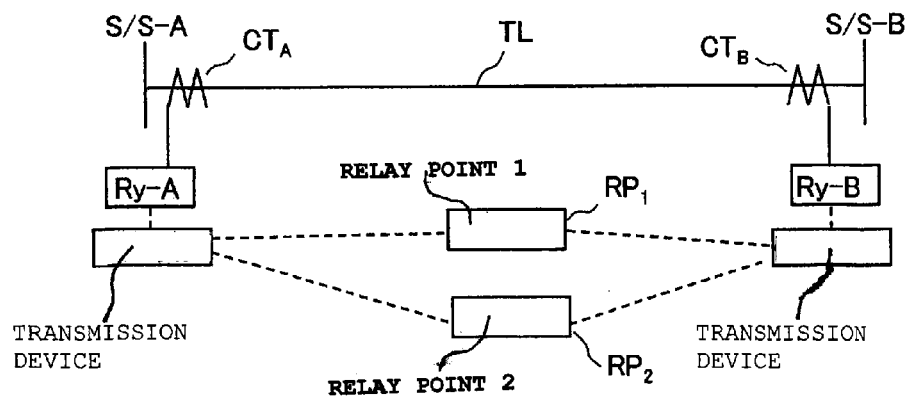
FIG. 17 is a view showing the system layout and the organization of communication channels in Embodiment 9 of the present invention.
Figure 18:
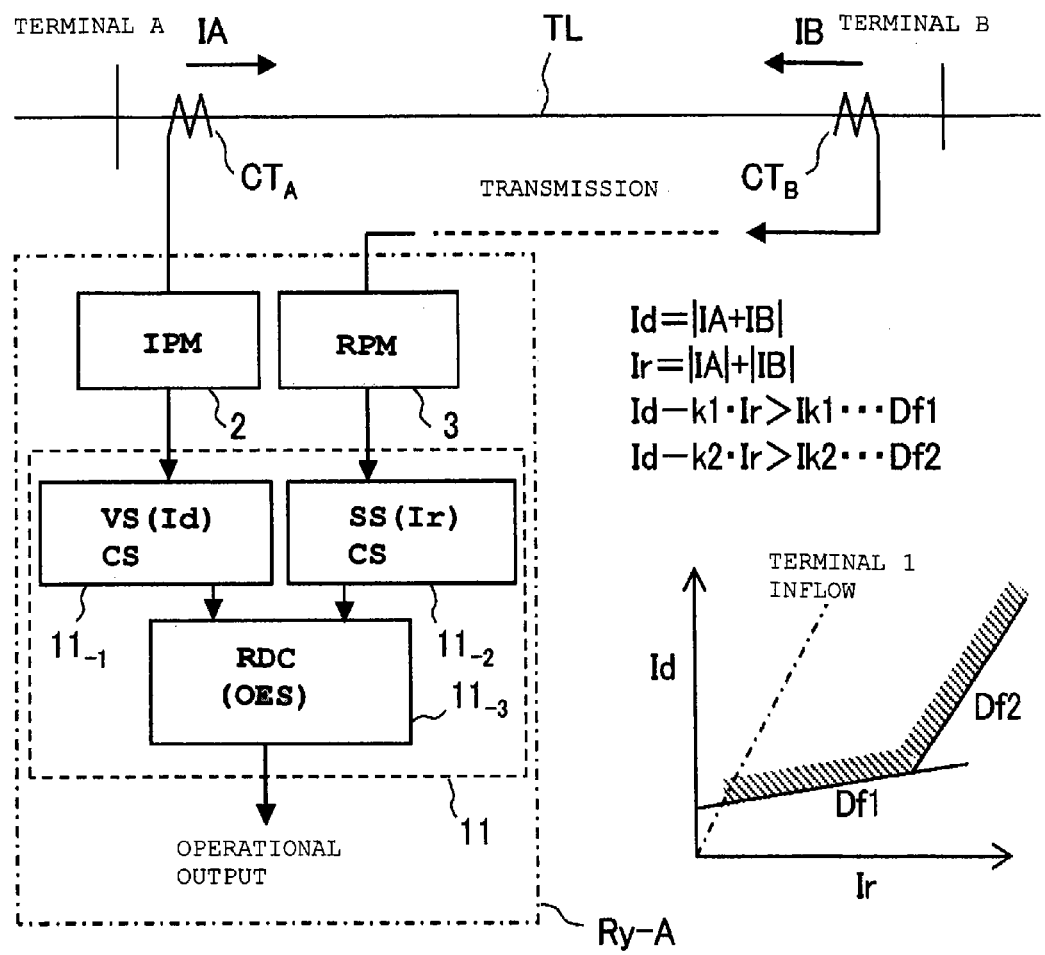
FIG. 18 is a layout diagram of a typical current difference transmission line protection arrangement.
Figure 19:
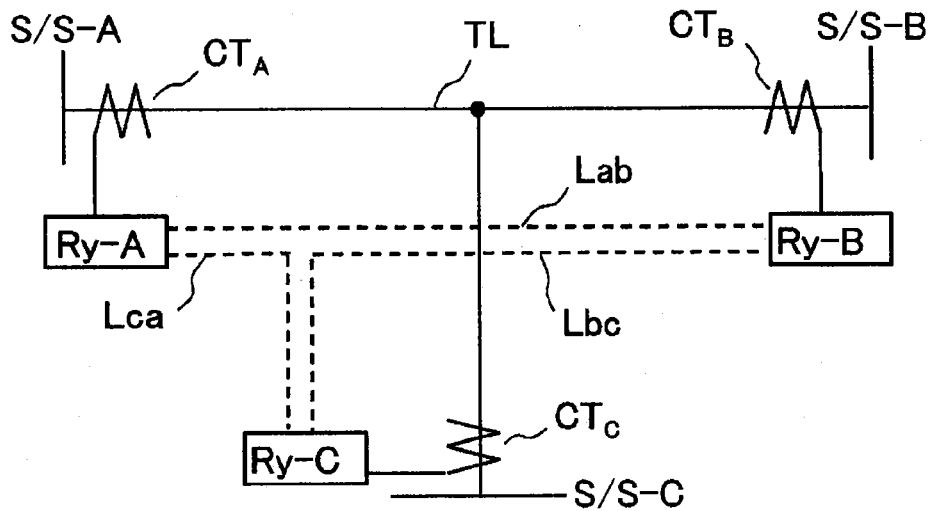
FIG. 19 is a layout diagram of the case where current difference transmission line protection is applied to a typical three-terminal transmission line.
Figure 20:
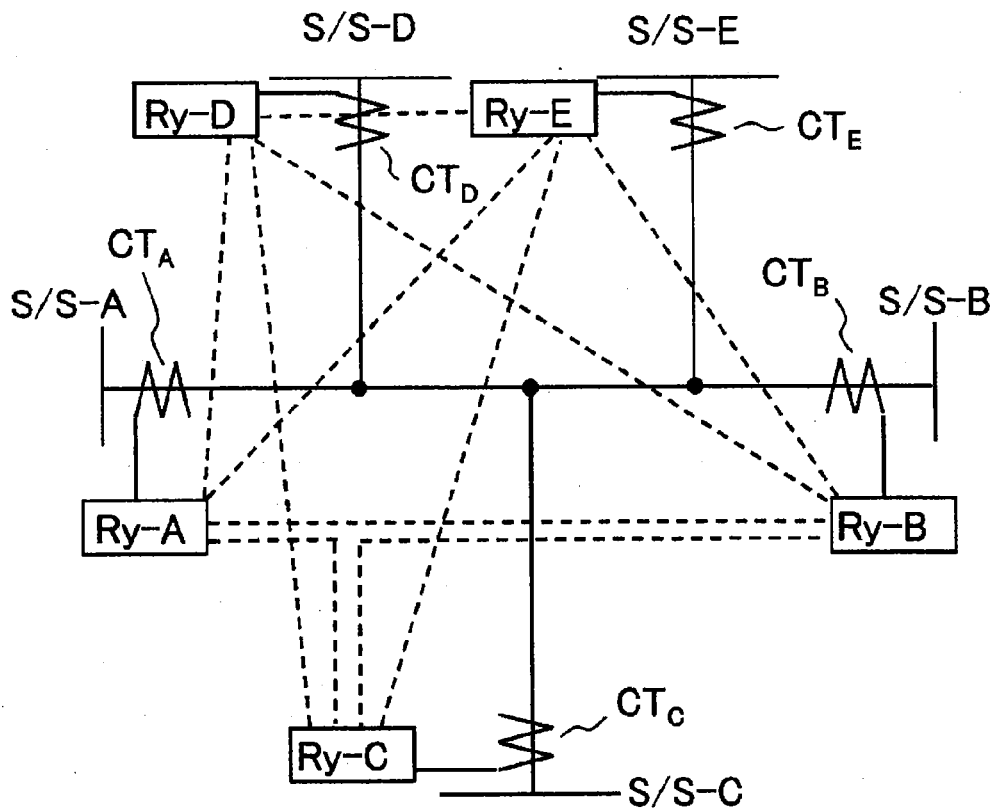
FIG. 20 is a layout diagram of an example where current difference transmission line protection is applied to a typical five-terminal transmission line.
Figure 21:
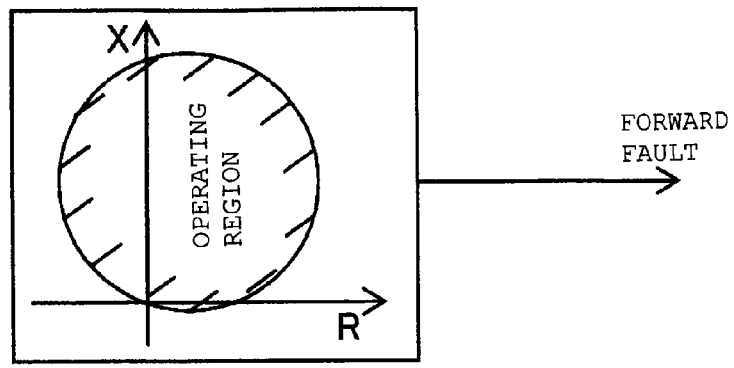
FIG. 21 is a Mho protective relay characteristic, constituting an example of a typical distance protective relay characteristic.
Figure 22:
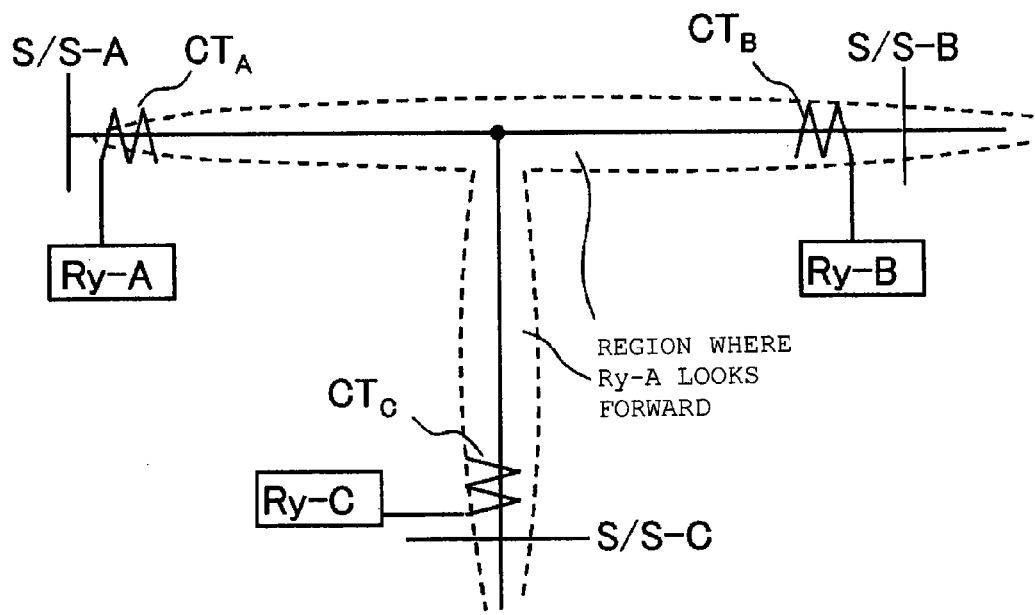
FIG. 22 is a layout diagram of the case where a directional comparative distance protective relay is applied to a three-terminal transmission line.

FIG. 17 is a view showing the system layout and communication channel organization in Embodiment 9 of the present invention.

In this Embodiment 9, as shown in FIG. 17, a single transmission line TL is protected by a protective relay Ry-A and protective relay Ry-B. In this case, for example the protective relay Ry-A performs data exchange via the protective relay Ry-B and a "relay point 1" $RP_1$ as the main communication channel. If the technique of route designation is employed, as the second path, data is delivered designating a route via a "relay point 2" $RP_2$, leading to the protective relay Ry-B.

In this way, even if some problem occurs on the main transmission route, data reception can be performed via the path 2, and so can continue to be available for use. The computational processing means etc. are the same as in the case of Embodiment 1 and a description thereof is therefore dispensed with.

As described above, with this Embodiment 9, reliability of communication can be improved by delivering data via another path, so the utilization rate of the protective relays can be improved. It should be noted that, although, in this case, in general, implementation was effected by transmitting data including path information from the protective relays in two sets, implementation could also be achieved by amplifying and delivering data that was output from the protective relay as two sets by a communication device and delivering this to respective paths.

While various Embodiments of the present invention have been described above, these Embodiments are presented merely by way of example and are not intended to restrict the scope of the invention. Novel Embodiments could be implemented in various forms and various deletions, substitutions, or alterations could be made without departing from the gist of the invention. Such Embodiments or modifications thereof are included in the scope or gist of the invention and are included in the scope of the invention set out in the patent claims and equivalents thereof.

POSSIBILITIES OF INDUSTRIAL APPLICATION

The present invention can be applied to protective relay devices employed for protection of power transmission lines.

What is claimed is:

1. A transmission line protective relay device wherein evaluation of whether or not a fault has occurred on a protected transmission line that has terminals with transformers installed on multiple transmission lines with three terminals or more is performed by mutual exchange of terminal information based on currents input from said transformers of each terminal through respective communication channels, and current difference computation is performed using terminal information of a terminal in question and incoming terminal information received from remote terminals respectively, said transmission line protective relay device comprising:

an input processing means that is arranged to connect a transmission line protective relay device arranged at each terminal with each communication channel, and to output an incoming current at a terminal in question as terminal information by input processing, at each transmission line protective relay device of each terminal;

a plurality of reception processing means that respectively receives terminal information delivered from a remote terminal connected with said terminal in question by a communication channel;

a computational processing means that performs current difference computation by inputting terminal information that was output from said input means and terminal information of said remote terminal that was output from said plurality of reception means; and a transmission processing means that transmits main terminal information constituting said terminal information of said terminal in question and backup terminal information constituting terminal information of a remote terminal that is different from a remote terminal in question, to a remote terminal connected by a communication channel with said terminal in question, wherein said computational processing means, if said main terminal information and said backup terminal information cannot be received in a predetermined time from an arbitrary communication channel of communication channels, performs current difference computation using terminal information of all of said terminals, using said backup terminal information delivered through another communication channel, instead of said main terminal information that could not be received from said communication channel in question.

2. A transmission line protective relay device wherein evaluation of whether or not a fault has occurred on a protected transmission line that has terminals with transformers installed on a transmission line with three terminals or more is performed by mutual exchange of terminal information relating to a calculated direction of said fault point and impedance as far as and including said fault point based on voltages and currents input from said transformers of each terminal through respective communication channels, from information of a terminal in question and terminal information delivered from a plurality of remote terminals respectively, said transmission line protective relay device comprising:

an input processing means that is arranged to connect said transmission line protective relay device arranged at each terminal with each communication channel, and to output voltage and current that are input from said transformer at a terminal in question as terminal information by input processing, at each transmission line protective relay device of each terminal;

a plurality of reception processing means that respectively receives terminal information delivered from a remote terminal connected with said terminal in question by a communication channel;

a computational processing means that determines whether a forward fault is present or not by calculating a direction of a fault point and an impedance as far as and including said fault point, based on said voltage and current of said terminal in question that are output from said input processing means;

a final decision section that inputs computation result data obtained by said computational processing means and said terminal information that is output from said plurality of reception processing means and that makes a final decision to identify a transmission line as faulty, if all of said terminal information identifies said fault as a forward fault; and a transmission processing means that transmits main terminal information constituting calculation results data of said terminal in question and backup terminal information constituting terminal information of a remote terminal that is different from said remote terminal in question, to a remote terminal connected by a communication channel with said terminal in question, wherein said final decision section, if said main terminal information and backup terminal information cannot be received in a predetermined time from an arbitrary communication channel of communication channels, makes a final decision using said backup terminal information delivered through another communication channel, instead of said main terminal information that could not be received from said communication channel in question.

3. The transmission line protective relay device according to claim 1,
wherein said plurality of transmission processing means are constituted so as to transmit only a single item of backup terminal information determined by a preselected order, of said terminal information of other terminals, excluding a remote terminal that was connected with said terminal in question by said communication channel, in addition to main terminal information of said terminal in question, in respect of said transmission line protective relay device of a relay terminal connected with said transmission line protective terminal device of said terminal in question by said communication channel, and
when said computational processing means cannot receive said main terminal information and backup terminal information in a predetermined time from an arbitrary one communication channel of said communication channels, protective computation is performed by inputting said backup terminal information received through another communication circuit instead of said main terminal information which could not be received.

4. The transmission line protective relay device according to claim 1,
wherein said plurality of transmission processing means are constructed so as to provide a function of transmitting independently, in advance, said main terminal information of said terminal in question to said transmission line protective relay device of a remote terminal that was connected with said transmission line protective relay device of said terminal in question by said communication channel, and a function of transmitting, as succeeding terminal information, said backup terminal information, when said backup terminal information has been received from another terminal apart from said remote terminal that was connected with said terminal in question.

5. A transmission line protective relay device wherein evaluation of whether or not a fault has occurred on a protected transmission line wherein respective transmission line protective relay devices are installed at both terminals of a two-terminal transmission line that has two lines installed, terminal information being exchanged through communication channels mutually between transmission line protective relay devices that are respectively provided on opposite terminals, using terminal information of a terminal in question and terminal information received by a remote terminal, said transmission line protective relay device comprising:
an input processing means that delivers output as information of a terminal in question by input processing of current that is input from a transformer of said terminal in question;
a first reception processing means that receives terminal information transmitted from a remote terminal of a transmission line that is being protected;
a second reception processing means that receives terminal information transmitted from one terminal of a transmission line that is not being protected;
a third reception processing means that receives data obtained by said remote terminal of said transmission line that is being protected, in addition to terminal information obtained by said other terminal of said transmission line that is not being protected;
a first transmission processing means that transmits to a remote terminal of said transmission line that is being protected said terminal information of said terminal in question that was output from said input means;
a second transmission processing means that transmits in combination to a transmission line protective relay device provided at another terminal of said transmission line that is not being protected, said terminal information that is output from said second reception processing means and said terminal information of said terminal in question that is output from said input means; and
a third transmission processing means that transmits terminal information obtained by said other terminal of said transmission line that is not being protected, of said terminal information output from said third reception processing means, to a transmission line protection relay device of said one terminal of said transmission line that is not being protected; and
a computational processing means that performs protective computation by inputting terminal information obtained by said other terminal of said transmission line, which is being protected, of said terminal information of said terminal in question that was output from said input means and said terminal information that was output from said first reception processing means and said terminal information that was output from said third reception processing means.

6. A transmission line protective relay device wherein evaluation of whether or not a fault has occurred on a protected transmission line wherein respective transmission line protective relay devices are installed at both terminals of a two-terminal transmission line that has two lines installed, terminal information relating to a calculated direction of a fault point and impedance as far as and including said fault point based on voltages and currents input from transformers of each terminal being exchanged through communication channels mutually between said transmission line protective relay devices, by using said terminal information of said terminal in question and terminal information of a remote terminal that has thus been received, said transmission line protective relay device comprising:
an input processing means that delivers output as information of a terminal in question by input processing of voltage and current of said terminal in question that is input from a transformer of said terminal in question;
a first reception processing means that receives terminal information transmitted from a remote terminal of said transmission line that is being protected;
a second reception processing means that receives terminal information transmitted from one terminal of a transmission line that is not being protected;
a third reception processing means that receives terminal information obtained by said remote terminal of said transmission line that is being protected, in addition to a terminal information obtained by said other terminal of said transmission line that is not being protected;
a computational processing means that determines whether a forward fault is present or not by calculating a direction of said fault point and an impedance as far as and including said fault point, based on voltage and current of said terminal in question that are output from said input processing means;
a first transmission processing means that transmits to a remote terminal of said transmission line that is being protected said terminal information of said terminal in question that was output from said computational processing means;

a second transmission processing means that transmits in combination to a transmission line protective relay device provided at another terminal of said transmission line that is not being protected, the terminal information that is output from said second reception processing means and said terminal information of said terminal in question that is output from said computational processing means;

a third transmission processing means that transmits terminal information obtained by said other terminal of said transmission line that is not being protected, of said terminal information output from said third reception processing means, to a transmission line protection relay device of said one terminal of said transmission line that is not being protected; and a computational processing means that performs protective computation by inputting terminal information obtained by said other terminal of the transmission line, which is being protected, of said terminal information of said terminal in question that was output from said input means and said terminal information that was output from said first reception processing means and said terminal information that was output from said third reception processing means.

7. The transmission line protective relay device according to claim 2, wherein said plurality of transmission processing means are constituted so as to transmit only a single item of backup terminal information determined by a preselected order, of said terminal information of other terminals, excluding a remote terminal that was connected with said terminal in question by said communication channel, in addition to main terminal information of said terminal in question, in respect of said transmission line protective relay device of a relay terminal connected with said transmission line protective terminal device of said terminal in question by said communication channel, and when said computational processing means cannot receive said main terminal information and backup terminal information in a predetermined time from an arbitrary one communication channel of said communication channels, protective computation is performed by inputting said backup terminal information received through another communication circuit instead of said main terminal information which could not be received.

8. The transmission line protective relay device according to claim 2, wherein said plurality of transmission processing means are constructed so as to provide a function of transmitting independently, in advance, said main terminal information of said terminal in question to said transmission line protective relay device of a remote terminal that was connected with said transmission line protective relay device of said terminal in question by said communication channel, and a function of transmitting, as succeeding terminal information, said backup terminal information, when said backup terminal information has been received from another terminal apart from said remote terminal that was connected with said terminal in question.

* * * * *